US011920325B2

(12) United States Patent
Kanazawa et al.

(10) Patent No.: US 11,920,325 B2
(45) Date of Patent: Mar. 5, 2024

(54) CONSTRUCTION MACHINE

(71) Applicant: HITACHI CONSTRUCTION MACHINERY CO., LTD., Tokyo (JP)

(72) Inventors: Akira Kanazawa, Tokyo (JP); Hidekazu Moriki, Tokyo (JP); Takaaki Chiba, Tsuchiura (JP); Shinya Imura, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 448 days.

(21) Appl. No.: 17/289,365

(22) PCT Filed: Dec. 13, 2019

(86) PCT No.: PCT/JP2019/049037
§ 371 (c)(1),
(2) Date: Apr. 28, 2021

(87) PCT Pub. No.: WO2020/166192
PCT Pub. Date: Aug. 20, 2020

(65) Prior Publication Data

US 2021/0332563 A1 Oct. 28, 2021

(30) Foreign Application Priority Data

Feb. 15, 2019 (JP) ................................ 2019-025233

(51) Int. Cl.
*E02F 9/22* (2006.01)
*F15B 11/05* (2006.01)
(Continued)

(52) U.S. Cl.
CPC .......... *E02F 9/2228* (2013.01); *E02F 9/2203* (2013.01); *E02F 9/2285* (2013.01);
(Continued)

(58) Field of Classification Search
None
See application file for complete search history.

(56) References Cited

U.S. PATENT DOCUMENTS 5,535,587 A 7/1996 Tanaka et al.
6,173,573 B1 1/2001 Kamada
(Continued)

FOREIGN PATENT DOCUMENTS

DE 112015000185 T5 * 7/2016 ............ E02F 9/2228
EP 0 796 952 A1 9/1997
(Continued)

OTHER PUBLICATIONS

International Search Report of PCT/JP2019/049037 dated Mar. 3, 2020.
(Continued)

*Primary Examiner* — Amelia Vorce
(74) *Attorney, Agent, or Firm* — Mattingly & Malur, PC

(57) ABSTRACT

A construction machine is provided that can cause each hydraulic actuator to accurately operate according to operation by an operator in combined operation in which a hydraulic fluid of a hydraulic pump is subjected to flow dividing and is supplied to plural hydraulic actuators. A controller 10, in a case of determining that combined operation is being carried out, controls a regulator **7*a* in such a manner that the delivery flow rate of a hydraulic pump 7 becomes larger than the total target flow rate of plural hydraulic actuators 4*a*, 5*a*, and 6*a*, and controls the respective opening amounts of plural directional control valves 8*a*1, 8*a*3, and 8*a*5 in such a manner that the difference between the respective target flow rates of the plural hydraulic actuators and the respective inflow flow rates of the plural hydraulic actuators sensed by velocity sensors 12 to 14** becomes small.

6 Claims, 15 Drawing Sheets

(51) Int. Cl.

| | |
|---|---|
| ***F15B 11/16*** | (2006.01) |
| ***F15B 13/02*** | (2006.01) |
| *F15B 13/08* | (2006.01) |

(52) U.S. Cl.

CPC ............ *F15B 11/05* (2013.01); *F15B 11/161* (2013.01); *F15B 13/025* (2013.01); *E02F 9/22* (2013.01); *F15B 13/086* (2013.01); *F15B 2211/30535* (2013.01); *F15B 2211/351* (2013.01); *F15B 2211/45* (2013.01); *F15B 2211/6336* (2013.01); *F15B 2211/78* (2013.01)

(56) References Cited

U.S. PATENT DOCUMENTS

| | | | | |
|---|---|---|---|---|
| 2010/0154403 | A1* | 6/2010 | Brickner | F15B 11/165 60/452 |
| 2012/0093624 | A1* | 4/2012 | Ohhigashi | E02F 9/2203 414/722 |
| 2018/0238026 | A1* | 8/2018 | Choi | E02F 9/2203 |
| 2019/0010965 | A1 | 1/2019 | Green et al. | |
| 2020/0158143 | A1* | 5/2020 | Kondo | E02F 9/22 |
| 2021/0071391 | A1* | 3/2021 | Takahashi | F15B 11/163 |
| 2021/0198868 | A1* | 7/2021 | Maekawa | E02F 9/2285 |
| 2021/0222395 | A1* | 7/2021 | Matsuyama | E02F 3/435 |
| 2022/0002965 | A1* | 1/2022 | Misaki | E02F 3/435 |

FOREIGN PATENT DOCUMENTS

| | | | | |
|---|---|---|---|---|
| JP | 5-52203 | A | 3/1993 | |
| JP | 10-61604 | A | 3/1998 | |
| JP | 2000-35005 | A | 2/2000 | |
| JP | 2007-278457 | A | 10/2007 | |
| JP | 2010-25146 | A | 2/2010 | |
| JP | 2013-249886 | A | 12/2013 | |
| JP | 2016075303 | A * | 5/2016 | F15B 11/02 |
| JP | 2019-503455 | A | 2/2019 | |
| KR | 1997-0000242 | B1 | 1/1997 | |
| KR | 10-0212771 | B1 | 8/1999 | |
| KR | 1999-0087335 | A | 12/1999 | |
| WO | WO-2014168058 | A1 * | 10/2014 | E02F 9/2235 |
| WO | WO-2015025818 | A1 * | 2/2015 | E02F 9/2235 |
| WO | WO-2018021321 | A1 * | 2/2018 | E02F 3/435 |

OTHER PUBLICATIONS

Korean Office Action received in corresponding Korean Application No. 10-2021-7023093 dated Nov. 29, 2022.

International Preliminary Report on Patentability received in corresponding International Application No. PCT/JP2019/049037 dated Aug. 26, 2021.

* cited by examiner

CONSTRUCTION MACHINE

TECHNICAL FIELD

The present invention relates to a construction machine having a machine control function.

BACKGROUND ART

In association with responding to information-oriented working, among construction machines such as hydraulic excavators, there are ones having a machine control function that controls the position and posture of work mechanisms such as boom, arm, and bucket in such a manner that the work mechanisms move along a target working surface. As representative one thereof, what limits operation of the work mechanisms in such a manner that the bucket tip does not advance in the direction of the target working surface any more when the bucket tip approaches the target working surface is known.

In standards of civil engineering works execution management, a standard value of the acceptable accuracy in the height direction with respect to the target working surface is defined. When the accuracy of the finished shape of the working surface exceeds the acceptable value, redoing of working occurs and thus the work efficiency lowers. Therefore, the machine control function is required to have the control accuracy necessary to meet the acceptable accuracy of the finished shape.

In association with a spread of the machine control function, development of a function of holding or correcting the bucket angle or the tilt angle with respect to the target working surface is being advanced. Due to this, in the case in which the bucket angle or the tilt angle needs to be held or corrected, the number of hydraulic actuators that need to be simultaneously controlled by the machine control function increases compared with a conventional machine control function that merely carries out combined operation of arm and boom, and it is required to control plural hydraulic actuators simultaneously and accurately.

As one of general methods for improving the control accuracy of the hydraulic actuator, there are methods using feedback control in which the flow rate of inflow to the hydraulic actuator is estimated and the error from a target inflow flow rate is corrected. However, in these control methods, control of the flow rate of inflow to a single hydraulic actuator is assumed in many methods, whereas control of the flow rate of inflow to plural hydraulic actuators through flow dividing is assumed in a small number of methods.

A technique in which flow dividing into plural hydraulic actuators is assumed and a hydraulic pump is electronically controlled on the basis of an estimated inflow flow rate is disclosed in patent document 1. In a control system of a hydraulic excavator shown in patent document 1, at the time of flow dividing control of the hydraulic actuators, the inflow flow rate is controlled by the hydraulic pump regarding a high-load-side hydraulic actuator with a high load and the inflow flow rate is controlled by a pressure compensating valve and a meter-in valve regarding a low-load-side hydraulic actuator with a low load. At this time, the target delivery flow rate of the hydraulic pump is corrected on the basis of the estimated inflow flow rate.

PRIOR ART DOCUMENT

Patent Document

Patent Document 1: JP-2007-278457-A

SUMMARY OF THE INVENTION

Problem to be Solved by the Invention

The control system of patent document 1 causes the estimation result of the inflow flow rate to be reflected in control of the delivery flow rate of the hydraulic pump. However, the leakage of the inflow flow rate, the influence of flow rate loss due to compression, and characteristics of the mater-in valve differ for each actuator section. Therefore, flow rate errors different for each actuator section are caused. For this reason, it is impossible to correct the flow rate errors of all actuator sections by only correcting the delivery flow rate of the hydraulic pump existing on the most upstream side of the hydraulic circuit. Therefore, for improving the flow rate control accuracy also at the time of flow dividing, the opening amount of the meter-in valve of the hydraulic actuator that operates needs to be directly corrected individually.

In the case of directly correcting the opening amount of the meter-in valve on the basis of the estimated inflow flow rate, interference with the delivery flow rate control of the hydraulic pump needs to be avoided. When both the opening amount of the meter-in valve and the delivery flow rate of the hydraulic pump are corrected on the basis of the estimated inflow flow rate, if the degree of correction is high, there is a possibility that interference of the control of the opening amount and the delivery flow rate occurs and hunting occurs in the inflow flow rate. In contrast, if the degree of correction is low, convergence of the actual inflow flow rate to the hydraulic actuator on the target inflow flow rate is delayed and therefore performance of transient following for the target inflow flow rate lowers.

Furthermore, if the delivery flow rate from the hydraulic pump is insufficient with respect to the target inflow flow rate when the opening amount of the mater-in valve is directly corrected on the basis of the estimated inflow flow rate, an error is generated between the target inflow flow rate and the actual inflow flow rate. In this case, the opening amounts of all meter-in valves become larger than the target value and thus distribution control of the inflow flow rate becomes difficult. Therefore, it is desirable to correct only the opening amount of the mater-in valve with avoidance of the situation in which the delivery flow rate from the hydraulic pump is insufficient.

The present invention is made in view of the above-described problem and an object thereof is to provide a construction machine that can cause each hydraulic actuator to accurately operate according to operation by an operator in combined operation in which a hydraulic fluid delivered from a hydraulic pump is subjected to flow dividing and is supplied to plural hydraulic actuators.

Means for Solving the Problem

In order to achieve the above-described object, the present invention provides a construction machine including a hydraulic pump, a regulator that adjusts the delivery flow rate of the hydraulic pump, a plurality of hydraulic actuators, a plurality of directional control valves that adjust the flow rate of a hydraulic fluid that is delivered from the hydraulic pump and is distributed to the plurality of hydraulic actuators, and an operation device for operating the plurality of hydraulic actuators. The construction machine includes also a controller configured to decide a target flow rate that is a target value of the inflow flow rate of each of the plurality of hydraulic actuators on the basis of an operation signal inputted from the operation device and control the regulator and the plurality of directional control valves according to the respective target flow rates of the plurality of hydraulic actuators. This construction machine includes velocity sensors that sense the respective operation velocities of the plurality of hydraulic actuators. The controller is configured to calculate the respective inflow flow rates of the plurality of hydraulic actuators on the basis of the respective operation velocities of the plurality of hydraulic actuators sensed by the velocity sensors, determine whether or not combined operation in which two or more hydraulic actuators in the plurality of hydraulic actuators are simultaneously operated is being carried out on the basis of the operation signal inputted from the operation device, and in a case of determining that the combined operation is being carried out, control the regulator in such a manner that the delivery flow rate of the hydraulic pump becomes larger than the total target flow rate of the plurality of hydraulic actuators and control the respective opening amounts of the plurality of directional control valves in such a manner that the difference between the respective target flow rates of the plurality of hydraulic actuators and the respective inflow flow rates of the plurality of hydraulic actuators sensed by the velocity sensors becomes small.

According to the present invention configured as above, when it is determined that the combined operation is being carried out, the delivery flow rate of the hydraulic pump is increased relative to the total target flow rate of the plural hydraulic actuators. In addition, the difference between the respective inflow flow rates and the respective target flow rates of the plural hydraulic actuators is reflected only in control of the respective opening amounts of the plural directional control valves. This can prevent interference between the delivery flow rate control of the hydraulic pump and the opening control of the plural directional control valves with avoidance of the situation in which the delivery flow rate of the hydraulic pump is insufficient. Due to this, the flow rate can be accurately distributed to the plural hydraulic actuators. Therefore, it becomes possible to cause the plural hydraulic actuators to accurately operate according to operation by the operator.

Advantages of the Invention

According to the construction machine according to the present invention, it becomes possible to cause each hydraulic actuator to accurately operate according to operation by an operator in combined operation in which a hydraulic fluid of a hydraulic pump is subjected to flow dividing and is supplied to plural hydraulic actuators.

MODES FOR CARRYING OUT THE INVENTION

Description will be made below with reference to the drawings by taking a hydraulic excavator as an example as a construction machine according to embodiments of the present invention. In the respective diagrams, equivalent components are given the same numeral and overlapping description is omitted as appropriate.

First Embodiment

Figure 1:
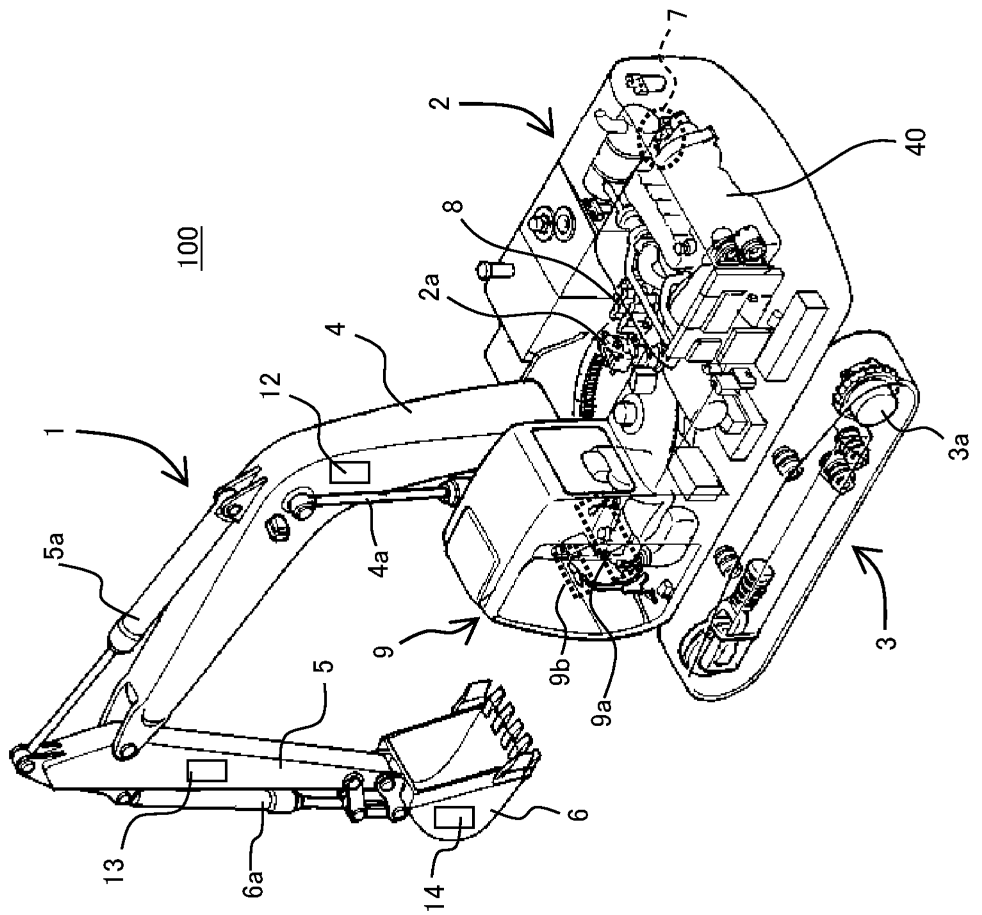
FIG. 1 is a diagram schematically illustrating the appearance of a hydraulic excavator according to a first embodiment of the present invention.

FIG. 1 is a diagram schematically illustrating the appearance of a hydraulic excavator according to a first embodiment of the present invention.

In FIG. 1, a hydraulic excavator 100 includes an articulated front device (front work implement) 1 configured by linking plural driven members (boom 4, arm 5, and bucket (work equipment) 6) that are each pivoted in the perpendicular direction, and an upper swing structure 2 and a lower track structure 3 that configure a machine body. The upper swing structure 2 is disposed swingably relative to the lower track structure 3. Furthermore, the base end of the boom 4 of the front device 1 is supported by the front part of the upper swing structure 2 pivotally in the perpendicular direction. One end of the arm 5 is supported by the end part (tip) of the boom 4 different from the base end pivotally in the perpendicular direction. The bucket 6 is supported by the other end of the arm 5 pivotally in the perpendicular direction. The boom 4, the arm 5, the bucket 6, the upper swing structure 2, and the lower track structure 3 are driven by a boom cylinder 4*a*, an arm cylinder 5*a*, a bucket cylinder 6*a*, a swing motor 2*a*, and left and right traveling motors 3*a* (only one traveling motor is illustrated), respectively, that are hydraulic actuators.

The boom 4, the arm 5, and the bucket 6 operate on a single plane (hereinafter, operation plane). The operation plane is a plane orthogonal to the pivot axes of the boom 4, the arm 5, and the bucket 6 and can be set to pass through the center of the boom 4, the arm 5, and the bucket 6 in the width direction.

In a cab 9 in which an operator rides, an operation lever device (operation device) 9*a* that outputs an operation signal for operating the hydraulic actuators 2*a* and 4*a* to 6*a* and an operation lever device (operation device) 9*b* that outputs an operation signal for driving the traveling motors 3*a* are disposed. The operation lever device 9*a* is two operation levers that can be inclined forward, rearward, leftward, and rightward and the operation lever device 9*b* is two operation levers that can be inclined in the front-rear direction. The operation lever devices 9*a* and 9*b* include a sensor that electrically senses an operation signal corresponding to the inclination amount of the operation lever (lever operation amount). The lever operation amount sensed by this sensor is outputted to a controller 10 (illustrated in FIG. 2) that is a controller through an electrical wiring line.

Operation control of the boom cylinder 4*a*, the arm cylinder 5*a*, the bucket cylinder 6*a*, the swing motor 2*a*, and the left and right traveling motors 3*a* is carried out by controlling, by a control valve 8, the direction and the flow rate of a hydraulic operating fluid supplied from a hydraulic pump 7 driven by a prime mover 40 to the respective hydraulic actuators 2*a* to 6*a*. Control of the control valve 8 is carried out by a drive signal (pilot pressure) output from a pilot pump 70 to be described later through a solenoid proportional pressure reducing valve to be described later. By controlling the solenoid proportional pressure reducing valve by the controller 10 on the basis of the operation signal from the operation lever devices 9*a* and 9*b*, operation of the respective hydraulic actuators 2*a* to 6*a* is controlled.

The operation lever devices 9*a* and 9*b* may be a hydraulic pilot system different from the above description and may be each configured to supply a pilot pressure according to the operation direction and the operation amount of the operation lever operated by an operator to the control valve 8 as a drive signal. In this case, the configuration may be made in such a manner that the pilot pressure according to the operation amount is sensed by a pressure sensor and the sensed pressure is outputted to the controller 10 as an electrical signal and the respective hydraulic actuators 2*a* to 6*a* are driven by the solenoid proportional pressure reducing valve to be described later.

Inertial measurement units 12 to 14 are what measure the angular velocity and the acceleration. The boom inertial measurement unit 12, the arm inertial measurement unit 13, and the bucket inertial measurement unit 14 configure a boom cylinder velocity sensor 12, an arm cylinder velocity sensor 13, and a bucket cylinder velocity sensor 14 that sense the operation velocity of the boom cylinder 4*a*, the arm cylinder 5*a*, and the bucket cylinder 6*a*, respectively, on the basis of the measured angular velocity and acceleration.

The cylinder velocity sensor is not limited to the inertial measurement unit. For example, the configuration may be made in such a manner that a stroke sensor is disposed for each the boom cylinder 4*a*, the arm cylinder 5*a*, and the bucket cylinder 6*a* and the operation velocity of the boom cylinder 4*a*, the arm cylinder 5*a*, and the bucket cylinder 6*a* is computed by carrying out numerical differentiation of the stroke change amount.

Figure 2:
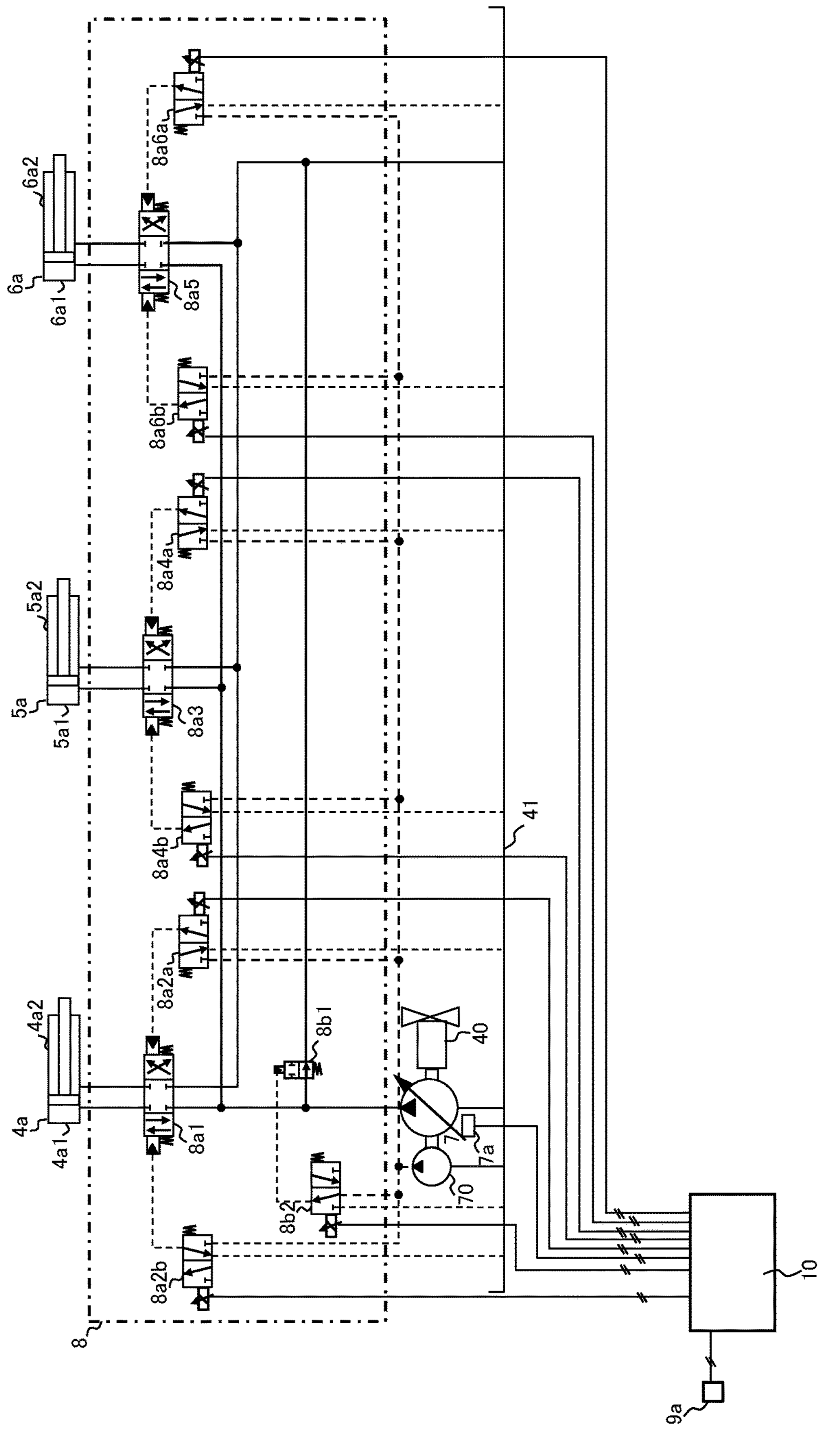
FIG. 2 is a diagram schematically illustrating a hydraulic actuator control system mounted in the hydraulic excavator illustrated in FIG. 1.

FIG. 2 is a diagram schematically illustrating a hydraulic actuator control system mounted in the hydraulic excavator 100. For simplification of explanation, only elements necessary for explanation of the invention are depicted. To simplify explanation, in FIG. 2, only a pump section to which the boom 4, the arm 5, and the bucket 6 are connected is depicted to be described.

The hydraulic actuator control system is composed of the control valve 8 that drives the respective hydraulic actuators 2*a* to 6*a*, the hydraulic pump 7 that supplies the hydraulic fluid to the control valve 8, the pilot pump 70 that supplies the pilot pressure that becomes the drive signal of the control valve 8, and the prime mover 40 for driving the hydraulic pump 7. In the present embodiment, a variable displacement type is employed as the hydraulic pump 7, and a solenoid proportional pressure reducing valve 7*a* for the variable displacement pump operates on the basis of a current command from the controller 10 and thereby the capacity of the hydraulic pump 7 is adjusted and the delivery flow rate of the hydraulic pump 7 is controlled. A configuration may be employed in which a fixed displacement type is employed as the hydraulic pump 7 and the rotation velocity of the prime mover 40 is adjusted by a control command from the controller 10 to control the delivery flow rate of the hydraulic pump 7.

The hydraulic fluid delivered by the hydraulic pump 7 is distributed to the respective hydraulic actuators by a boom directional control valve 8*a*1, an arm directional control valve 8*a*3, and a bucket directional control valve 8*a*5. The boom directional control valve 8*a*1 serves as an opening (meter-in opening) through which one of a bottom-side fluid chamber 4*a*1 or a rod-side fluid chamber 4*a*2 of the boom cylinder 4*a* communicates with a hydraulic fluid line that leads to the hydraulic pump 7, and serves as an opening (meter-out opening) through which the other communicates with a hydraulic fluid line that leads to a tank 41. Solenoid proportional pressure reducing valves 8*a*2 for the boom directional control valve operate on the basis of the current command ordered from the controller 10 and thereby the pilot pressure is adjusted, and thus the opening amount when the boom directional control valve 8*a*1 communicates with the bottom-side fluid chamber 4*a*1 or the rod-side fluid chamber 4*a*2 is controlled. When the solenoid proportional pressure reducing valve 8*a*2*a* is driven, the hydraulic fluid flows from the bottom-side fluid chamber 4*a*1 to the rod-side fluid chamber 4*a*2. On the other hand, when the solenoid proportional pressure reducing valve 8*a*2*b* is driven, the hydraulic fluid flows from the rod-side fluid chamber 4*a*2 to the bottom-side fluid chamber 4*a*1. The arm directional control valve 8*a*3 also similarly communicates with a bottom-side fluid chamber 5*a*1 and a rod-side fluid chamber 5*a*2 of the arm cylinder 5*a* and the opening amount thereof is controlled by solenoid proportional pressure reducing valves 8*a*4 for the arm directional control valve. The bucket directional control valve 8*a*5 communicates with a bottom-side fluid chamber 6*a*1 and a rod-side fluid chamber 6*a*2 of the bucket cylinder 6*a* and the opening amount thereof is controlled by solenoid proportional pressure reducing valves 8*a*6 for the bucket directional control valve.

Part of the hydraulic fluid delivered from the hydraulic pump 7 is discharged to the tank 41 by a bleed-off valve **8*b*1 communicating a hydraulic fluid line to the tank 41. For the bleed-off valve 8*b*1, a solenoid proportional pressure reducing valve 8*b*2 for the bleed-off valve operates on the basis of the current command ordered from the controller 10 and thereby the pilot pressure is adjusted, and thus the flow rate of the discharge to the tank 41 is controlled. Instead of installing the bleed-off valve 8*b*1, a configuration may be employed in which directional control valves of an open center type that allow three-direction control are employed as the directional control valves 8*a*1, 8*a*3, and 8*a*5** and a bleed-off opening is adjusted in conjunction with the meter-in opening and the meter-out opening.

Figure 3:
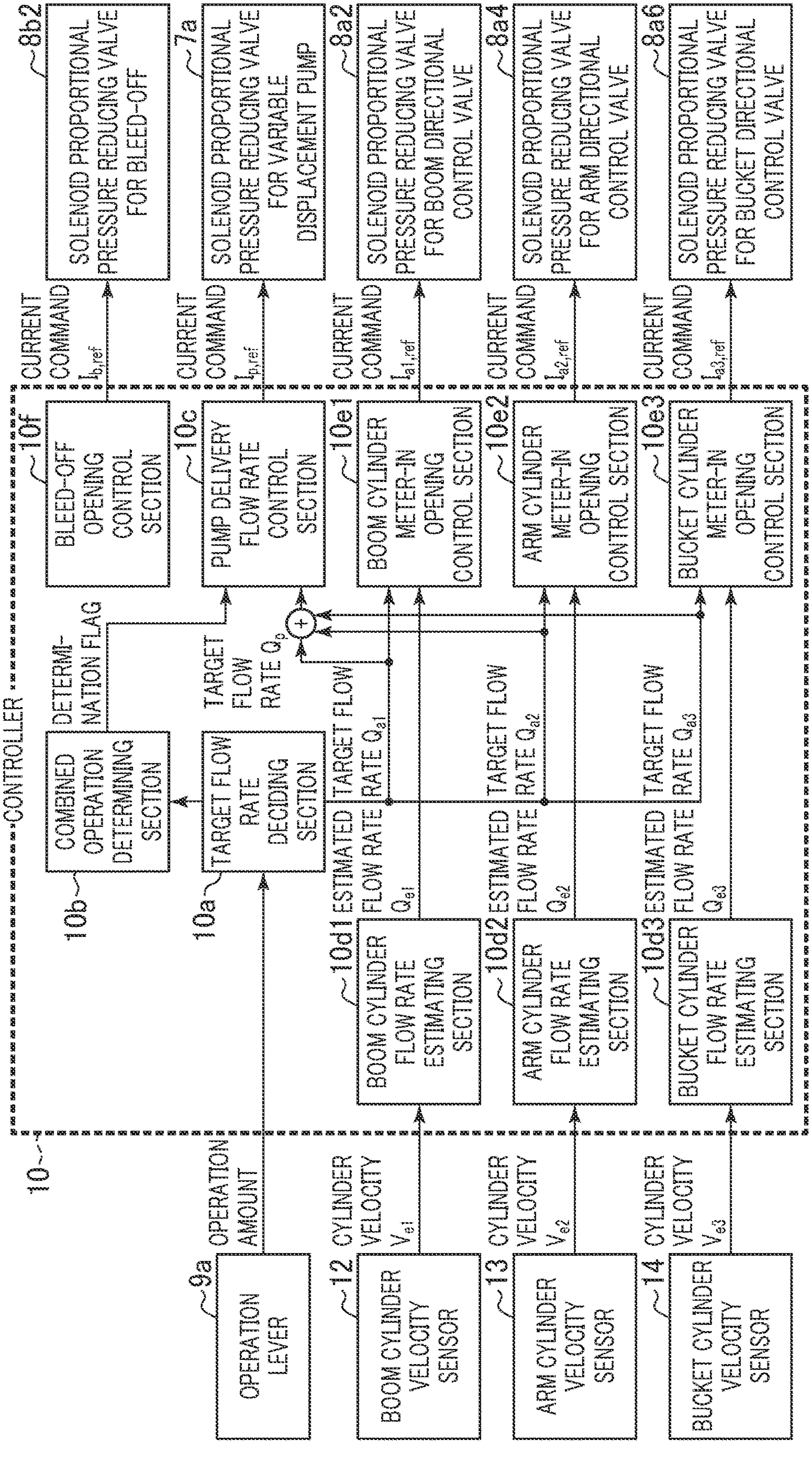
FIG. 3 is a functional block diagram that represents details of processing functions of a controller illustrated in FIG. 2.

FIG. 3 is a functional block diagram that represents details of processing functions of the controller 10. In FIG. 3, description will be made with omission of functions that do not directly relate to the present invention similarly to FIG. 2.

In FIG. 3, the controller 10 has a target flow rate deciding section **10*a*, a combined operation determining section 10*b*, a pump delivery flow rate control section 10*c*, a boom cylinder flow rate estimating section 10*d*1, an arm cylinder flow rate estimating section 10*d*2, a bucket cylinder flow rate estimating section 10*d*3, a boom cylinder meter-in opening control section 10*e*1, an arm cylinder meter-in opening control section 10*e*2, a bucket cylinder meter-in opening control section 10*e*3, and a bleed-off opening control section 10*f***.

The target flow rate deciding section **10*a* decides target flow rates $Q_{a1}$, $Q_{a2}$, and $Q_{a3}$ of inflow to the respective hydraulic actuators and the target flow rates of the respective hydraulic actuators 4*a* to 6*a* are outputted to the boom cylinder meter-in opening control section 10*e*1, the arm cylinder meter-in opening control section 10*e*2, and the bucket cylinder meter-in opening control section 10*e*3**.

In the present embodiment, the target flow rates $Q_{a1}$, $Q_{a2}$, and $Q_{a3}$ of inflow to the respective hydraulic actuators **4*a* to 6*a* are decided on the basis of the operation amount inputted from the operation lever device 9*a*. A configuration may be employed in which the target flow rates $Q_{a1}$, $Q_{a2}$, and $Q_{a3}$ are decided on the basis of the posture of the front device 1 of the hydraulic excavator 100 or the relative positional relation between the work equipment 6 of the front device 1 and the target working surface besides the operation amount inputted from the operation lever device 9*a***.

The combined operation determining section **10*b* determines whether the present state is the state in which two or more hydraulic actuators are simultaneously operating, i.e. a combined operation state. A determination flag that is a binary signal indicating whether the present state is the combined operation state is outputted to the pump delivery flow rate control section 10*c***.

In the present embodiment, whether the present state is the combined operation state is determined on the basis of the target flow rates $Q_{a1}$, $Q_{a2}$, and $Q_{a3}$ inputted from the target flow rate deciding section **10*a*. Whether the present state is the combined operation state may be determined on the basis of the operation amount inputted from the operation lever device 9*a***.

The pump delivery flow rate control section **10*c* decides the target delivery flow rate of the hydraulic pump 7 on the basis of a total value $Q_p$ of the target flow rates to the respective hydraulic actuators 4*a* to 6*a* computed by the target flow rate deciding section 10*a* and the combined operation determination flag inputted from the combined operation determining section 10*b*. When it is determined that the combined operation is being carried out, a flow rate obtained by adding an offset flow rate to be described later with FIG. 4 to the total value $Q_p$ of the target flow rates is set as the target delivery flow rate of the hydraulic pump 7 and a current command $I_{p,ref}$ for adjustment to capacity corresponding to it is outputted to the solenoid proportional pressure reducing valve 7*a*** for the variable displacement pump.

The boom cylinder flow rate estimating section **10*d*1, the arm cylinder flow rate estimating section 10*d*2, and the bucket cylinder flow rate estimating section 10*d*3 compute estimated flow rates $Q_{e1}$, $Q_{e2}$, and $Q_{e3}$ at which inflow to the boom cylinder 4*a*, the arm cylinder 5*a*, and the bucket cylinder 6*a* is estimated to be caused, on the basis of cylinder velocities $V_{e1}$, $V_{e2}$, and $V_{e3}$ sensed by the boom cylinder velocity sensor 12, the arm cylinder velocity sensor 13, and the bucket cylinder velocity sensor 14. In the boom cylinder flow rate estimating section 10*d*1, the estimated flow rate $Q_{e1}$ of the boom cylinder 4*a*** is computed from the following expression (1).

[Expression 1]

$$Q_{e1}=S_{a1}V_{e1} \tag{1}$$

Here, $S_{a1}$ is the sectional area of the boom cylinder **4*a*. When the hydraulic fluid flows in from the bottom-side fluid chamber 4*a*1, the sectional area of the bottom side of the boom cylinder 4*a* is defined as $S_{a1}$. When the hydraulic fluid flows in from the rod-side fluid chamber 4*a*2, the sectional area of the rod side of the boom cylinder 4*a* is defined as $S_{a1}$. Also regarding the arm cylinder flow rate estimating section 10*d*2 and the bucket cylinder flow rate estimating section 10*d*3, the estimated flow rates $Q_{e2}$ and $Q_{e3}$ are computed by similar calculation with use of expression (1). Thus, detailed description is omitted. The estimated flow rates $Q_{e1}$, $Q_{e2}$, and $Q_{e3}$ are outputted to the boom cylinder meter-in opening control section 10*e*1, the arm cylinder meter-in opening control section 10*e*2, and the bucket cylinder meter-in opening control section 10*e*3**, respectively.

The boom cylinder meter-in opening control section **10*e*1, the arm cylinder meter-in opening control section 10*e*2, and the bucket cylinder meter-in opening control section 10*e*3 decide the opening amount of the meter-in valves 8*a*1, 8*a*3, and 8*a*5 in such a manner as to correct the error between the target flow rate and the estimated flow rate, on the basis of the inflow flow rate $Q_{e1}$ to the boom cylinder estimated by the boom cylinder flow rate estimating section 10*d*1, the inflow flow rate $Q_{e2}$ to the arm cylinder estimated by the arm cylinder flow rate estimating section 10*d*2, the inflow flow rate $Q_{e3}$ to the bucket cylinder estimated by the bucket cylinder flow rate estimating section 10*d*3, and the target flow rates $Q_{a1}$, $Q_{a2}$, and $Q_{a3}$ to the respective hydraulic actuators computed by the target flow rate deciding section 10*a*. Current commands $I_{a1,ref}$, $I_{a2,ref}$, and $I_{a3,ref}$ for adjustment to the decided opening amounts are outputted to the solenoid proportional pressure reducing valves 8*a*2 for the boom directional control valve, the solenoid proportional pressure reducing valves 8*a*4 for the arm directional control valve, and the solenoid proportional pressure reducing valves 8*a*6** for the bucket directional control valve.

In the boom cylinder meter-in opening control section **10*e*1, the current command $T_{a1,ref}$ to the solenoid proportional pressure reducing valves 8*a*2** for the boom directional control valve is calculated with the following expressions (2), (3), and (4).

[Expression 2]

$$Q_{a1,new}=Q_{a1}+K_I\int(Q_{a1}-Q_{e1})dt \quad (2)$$

[Expression 3]

$$A_{a1}=f_1(Q_{a1,new}) \quad (3)$$

[Expression 4]

$$I_{a1,ref}=g_1(A_{a1}) \quad (4)$$

Here, $Q_{a1,new}$ is the target flow rate to the boom cylinder 4*a* resulting from addition of a correction amount computed on the basis of the estimated flow rate $Q_{e1}$. $A_{a1}$ is the target opening amount of the boom meter-in valve 8*a*1. $K_I$ is the feedback gain of integral control. $f_1$ is a transformation table from the post-correction target flow rate $Q_{a1,new}$ to the target opening amount $A_{a1}$. $g_1$ is a transformation table from the target opening amount $A_{a1}$ to the current command $I_{a1,ref}$. In expression (2), a feed-forward amount to command the target flow rate $Q_{a1}$ as it is and a feedback amount to correct the error between the target flow rate $Q_{a1}$ and the estimated flow rate $Q_{e1}$ are added to each other. By correcting the error between the target flow rate $Q_{a1}$ and the estimated flow rate $Q_{e1}$, achievement of robustness against variation in dynamic characteristics of the hydraulic system due to the influence of the fluid temperature and so forth is intended. Furthermore, by integrating the error between the target flow rate $Q_{a1}$ and the estimated flow rate $Q_{e1}$ to make the correction amount, a stationary flow rate error that occurs due to an error in the flow rate coefficient and flow rate loss of the hydraulic fluid is eliminated.

Also in the arm cylinder meter-in opening control section 10*e*2 and the bucket cylinder meter-in opening control section 10*e*3, the current commands $I_{a2,ref}$ and $I_{a3,ref}$ are computed by similar calculation with use of expressions (2) to (4). Thus, detailed description is omitted.

The bleed-off opening control section 10*f* calculates and outputs a current command $I_{b,ref}$ to the solenoid proportional pressure reducing valve 8*b*2 for bleed-off. As one example, the bleed-off valve 8*b*1 in the present embodiment is controlled to be always in the state in which a constant opening is opened irrespective of the operation amount of the operation levers 9*a* and 9*b*. A configuration may be employed in which the opening amount of the bleed-off valve 8*b*1 is adjusted to be subordinate to the opening amount of the directional control valves 8*a*1, 8*a*3, and 8*a*5.

Figure 4:
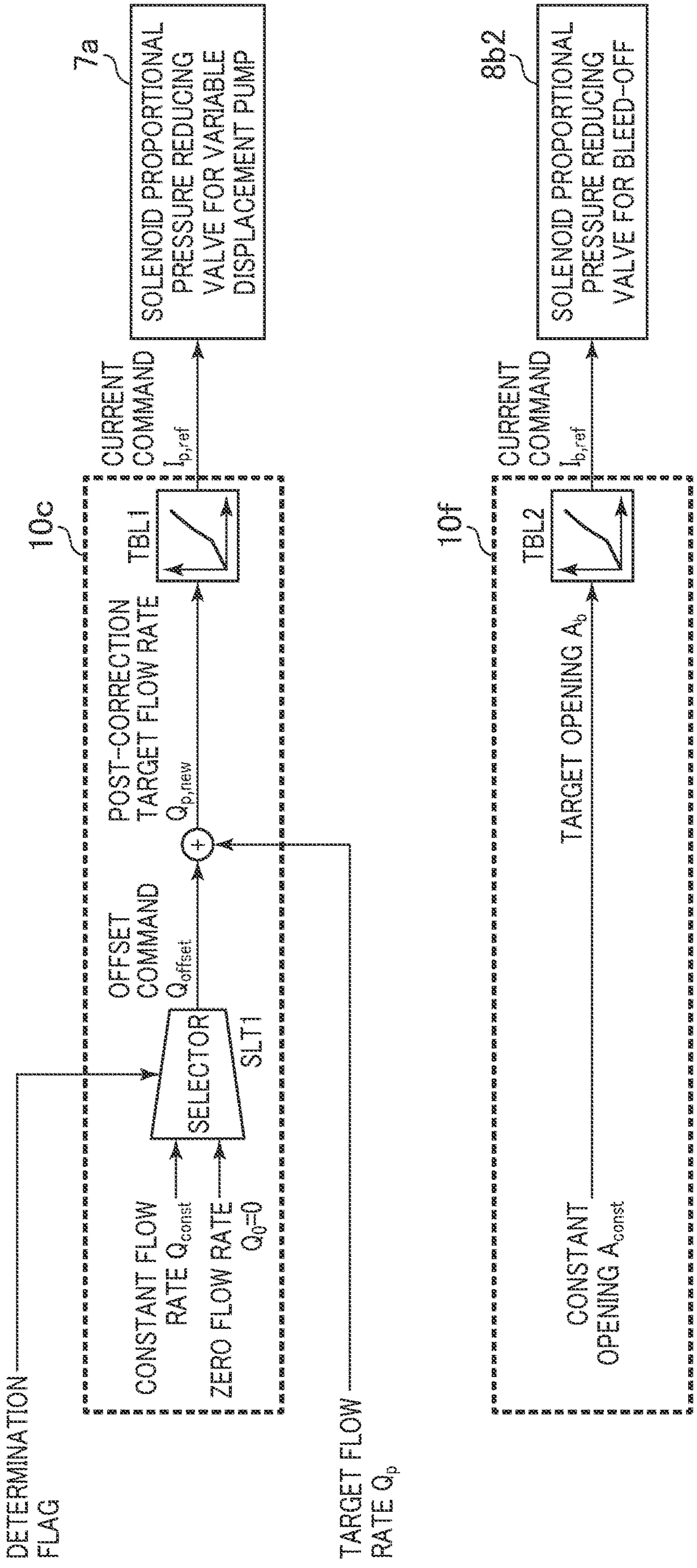
FIG. 4 is a control block diagram that represents details of a calculation function of a pump delivery flow rate control section illustrated in FIG. 3 and a calculation function of a bleed-off opening control section.

FIG. 4 is a control block diagram that represents details of a calculation function of the pump delivery flow rate control section 10*c* and a calculation function of the bleed-off opening control section 10*f*.

In the pump delivery flow rate control section 10*c*, on the basis of the determination flag inputted from the combined operation determining section 10*b*, a constant flow rate $Q_{const}$ is selected by a selector SLT1 when the combined operation is being carried out and a zero flow rate $Q_0=0$ is selected by the selector SLT1 when the combined operation is not being carried out. The selected flow rate is transmitted as an offset command $Q_{offset}$ and is added to a target flow rate $Q_p$ to become a post-correction target flow rate $Q_{p,new}$. Finally, transformation is carried out from the post-correction target flow rate $Q_{p,new}$ to the current command $I_{p,ref}$ by a transformation table TBL and the current command $I_{p,ref}$ is outputted to the solenoid proportional pressure reducing valve 7*a* for the variable displacement pump.

By determining that the combined operation is being carried out and increasing the delivery flow rate of the hydraulic pump 7 with respect to the target flow rate $Q_p$, the situation in which the delivery flow rate of the hydraulic pump 7 is insufficient with respect to the target flow rate $Q_p$ can be surely avoided.

In the bleed-off opening control section 10*f*, a constant opening amount $A_{const}$ set in advance is given as a target opening amount $A_b$ and transformation is carried out from the target opening amount $A_b$ to the current command $I_{b,ref}$ by a transformation table TBL2. The current command $I_{b,ref}$ is outputted to the solenoid proportional pressure reducing valve 8*b*2 for bleed-off.

By always opening the bleed-off valve 8*b*1 by the constant opening amount $A_{const}$, the delivery flow rate of the hydraulic pump 7 as the part that becomes surplus due to the offset command $Q_{offset}$ can be discharged from the bleed-off valve 8*b*1 and the situation in which the surplus hydraulic fluid flows in to the hydraulic actuators 4*a* to 6*a* can be avoided.

Figure 5:
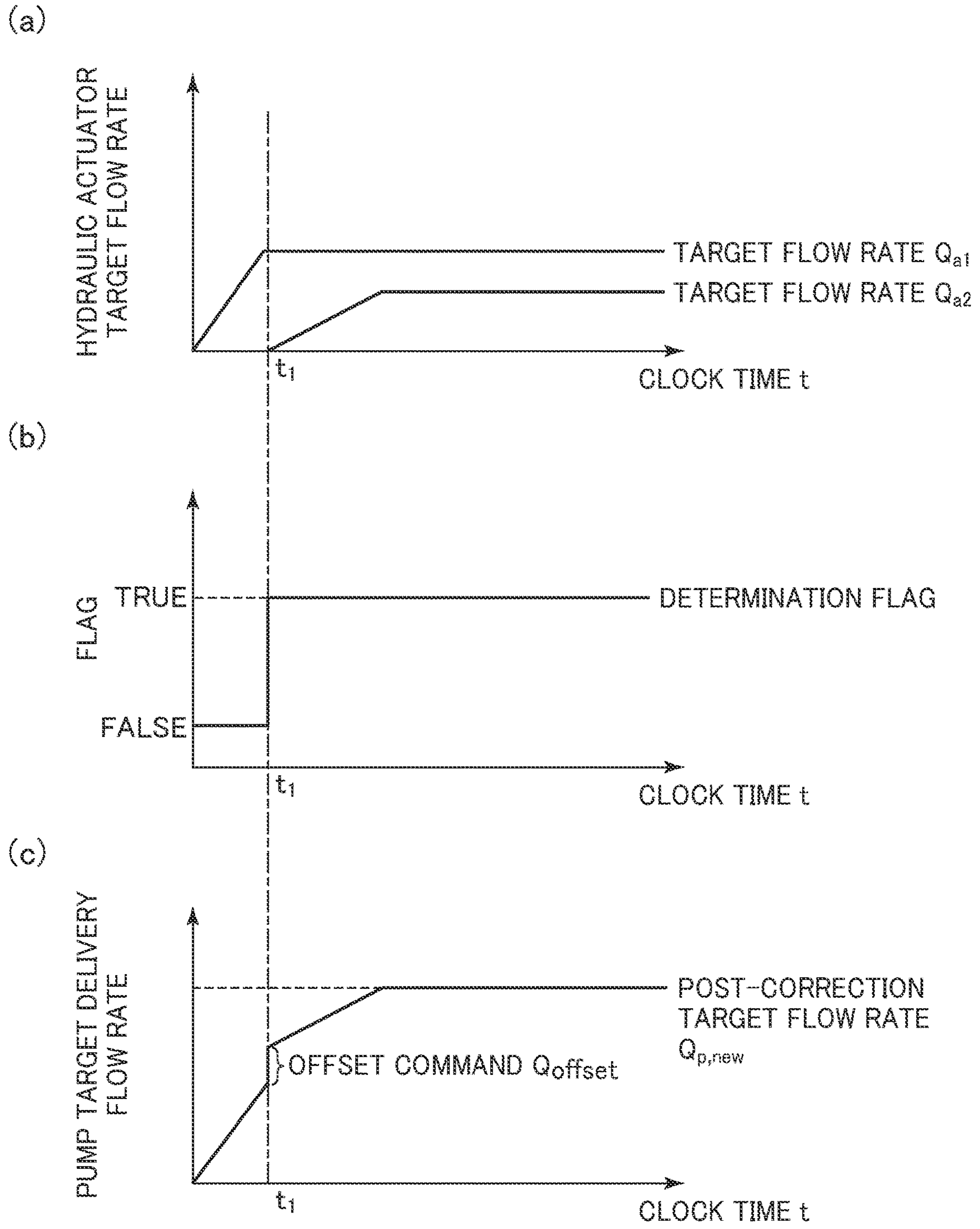
FIG. 5 is a diagram illustrating one example of calculation results in a target flow rate deciding section, a combined operation determining section, and the pump delivery flow rate control section that are illustrated in FIG. 3.

FIG. 5 is a diagram illustrating one example of calculation results in the target flow rate deciding section 10*a*, the combined operation determining section 10*b*, and the pump delivery flow rate control section 10*c*.

FIG. 5(*a*) illustrates the target flow rate decided by the target flow rate deciding section 10*a* based on the operation amount inputted from the operation lever device 9*a*. In the present embodiment, the case in which first the target flow rate $Q_{a1}$ is input to the boom cylinder meter-in opening control section 10*e*1 and the target flow rate $Q_{a2}$ is input to the arm cylinder meter-in opening control section 10*e*2 at a clock time $t_1$ is taken as one example. In this case, at and after the clock time $t_1$, the target flow rates $Q_{a1}$ and $Q_{a2}$ are simultaneously output from the target flow rate deciding section 10*a*.

FIG. 5(*b*) illustrates the determination flag judged by the combined operation determining section 10*b* based on the target flow rate inputted from the target flow rate deciding section 10*a*. Before the clock time $t_1$, since being given only the target flow rate $Q_{a1}$ to the boom cylinder 4*a* from the target flow rate deciding section 10*a*, the combined operation determining section 10*b* judges that the combined operation is not being carried out, and outputs the determination flag as False. At and after the clock time $t_1$, since being given the target flow rate $Q_{a1}$ to the boom cylinder 4*a* and the target flow rate $Q_{a2}$ to the arm cylinder 5*a* from the target flow rate deciding section 10*a*, the combined operation determining section 10*b* judges that the combined operation is being carried out, and outputs the determination flag as True.

FIG. 5(*c*) illustrates the post-correction target flow rate $Q_{p,new}$ decided by the pump delivery flow rate control section 10*d* based on the target flow rate inputted from the target flow rate deciding section 10*a* and the determination flag inputted from the combined operation determining section 10*b*. Before the clock time $t_1$, the target flow rate deciding section 10*a* outputs only the target flow rate $Q_{a1}$ and the combined operation determining section 10*b* determines that the combined operation is not being carried out. Therefore, post-correction target flow rate $Q_{p,new}=Q_{a1}$ holds. At and after the clock time $t_1$, the target flow rate deciding section 10*a* outputs the target flow rates $Q_{a1}$ and $Q_{a2}$ and the combined operation determining section 10*b* determines that the combined operation is being carried out. Therefore, post-correction target flow rate $Q_{p,new}=Q_{a1}+Q_{a2}+Q_{offset}$ holds.

Figure 6:
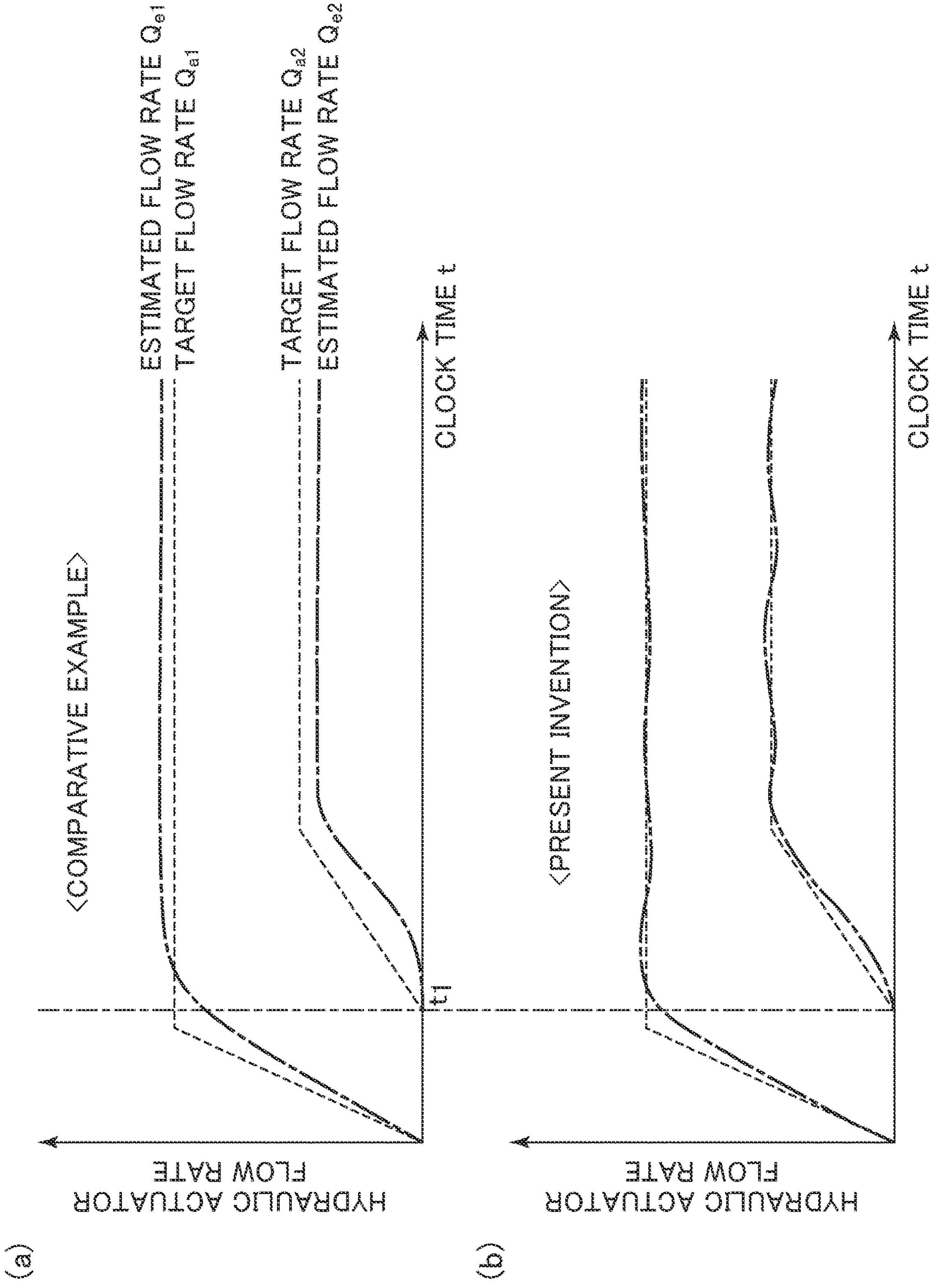
FIG. 6 is a diagram illustrating an effect of correction of the error between the target flow rate and the estimated flow rate to the hydraulic actuator according to the first embodiment of the present invention.

FIG. 6 is a diagram illustrating an effect of correction of the error between the target flow rate and the estimated flow rate to the hydraulic actuator according to the present embodiment. Similarly to FIG. 5, the case in which the target flow rate $Q_{a1}$ is input to the boom cylinder meter-in opening control section **10*e*1 and the target flow rate $Q_{a2}$ is input to the arm cylinder meter-in opening control section 10*e*2** is taken as one example.

In FIG. 6(*a*), as a comparative example of the present embodiment, one example of flow rate distribution of the respective hydraulic actuators in the case in which only the target delivery flow rate of the hydraulic pump 7 is corrected and the meter-in opening is not corrected is illustrated. Flow rate losses generated in the boom cylinder **4*a* and the arm cylinder 5*a* and characteristics and flow rate coefficients of the boom meter-in valve 8*a*1 and the arm meter-in valve 8*a*3 are different. Therefore, an error is yielded in the distribution ratio of the inflow flow rates to the boom cylinder 4*a* and the arm cylinder 5*a*** and stationary errors are generated between the target flow rate $Q_{a1}$ and the estimated flow rate $Q_{e1}$ and between the target flow rate $Q_{a2}$ and the estimated flow rate $Q_{e2}$.

In FIG. 6(*b*), one example of flow rate distribution of the respective hydraulic actuators according to the present embodiment is illustrated. According to the errors between the target flow rate $Q_{a1}$ and the estimated flow rate $Q_{e1}$ and between the target flow rate $Q_{a2}$ and the estimated flow rate $Q_{e2}$, the boom cylinder meter-in opening control section **10*e*1 and the arm cylinder meter-in opening control section 10*e*2 correct the target opening amount on the basis of expressions (2) to (4). Due to this, the error in the distribution ratio of the inflow flow rates to the boom cylinder 4*a* and the arm cylinder 5*a* is corrected and the stationary errors between the target flow rate $Q_{a1}$ and the estimated flow rate $Q_{e1}$ and between the target flow rate $Q_{a2}$ and the estimated flow rate $Q_{e2}$ are dissolved. Furthermore, after the clock time $t_1$, at which the combined operation state is made, the performance of following of the arm estimated flow rate $Q_{e2}$ for the target flow rate $Q_{a2}$ is improved due to the increase in the delivery flow rate of the hydraulic pump 7 by the pump delivery flow rate control section 10*c***.

In the present embodiment, the construction machine 100 includes the hydraulic pump 7, the regulator **7*a* that adjusts the delivery flow rate of the hydraulic pump 7, the plural hydraulic actuators 4*a*, 5*a*, and 6*a*, the plural directional control valves 8*a*1, 8*a*3, and 8*a*5 that adjust the flow rate of the hydraulic fluid that is delivered from the hydraulic pump 7 and is distributed to the plural hydraulic actuators 4*a*, 5*a*, and 6*a*, and the operation device 9*a* for operating the plural hydraulic actuators 4*a*, 5*a*, and 6*a*. The construction machine 100 includes also the controller 10 that decides the target flow rate that is the target value of the inflow flow rate of each of the plural hydraulic actuators 4*a*, 5*a*, and 6*a* on the basis of an operation signal inputted from the operation device 9*a* and controls the regulator 7*a* and the plural directional control valves 8*a*1, 8*a*3, and 8*a*5 according to the respective target flow rates of the plural hydraulic actuators 4*a*, 5*a*, and 6*a*. This construction machine 100 includes the velocity sensors 12 to 14 that sense the respective operation velocities of the plural hydraulic actuators 4*a*, 5*a*, and 6*a*. The controller 10 calculates the respective inflow flow rates of the plural hydraulic actuators 4*a*, 5*a*, and 6*a* on the basis of the respective operation velocities of the plural hydraulic actuators 4*a*, 5*a*, and 6*a* sensed by the velocity sensors 12 to 14. The controller 10 determines whether or not the combined operation in which two or more hydraulic actuators in the plural hydraulic actuators 4*a*, 5*a*, and 6*a* are simultaneously operated is being carried out on the basis of the operation signal inputted from the operation device 9*a*. When determining that the combined operation is being carried out, the controller 10 controls the regulator 7*a* in such a manner that the delivery flow rate of the hydraulic pump 7 becomes larger than the total target flow rate of the plural hydraulic actuators and controls the respective opening amounts of the plural directional control valves 8*a*1, 8*a*3, and 8*a*5 in such a manner that the difference between the respective target flow rates of the plural hydraulic actuators 4*a*, 5*a*, and 6*a* and the respective inflow flow rates of the plural hydraulic actuators 4*a*, 5*a*, and 6*a* sensed by the velocity sensors 12 to 14** becomes small.

According to the present embodiment configured as above, when it is determined that the combined operation is being carried out, the delivery flow rate of the hydraulic pump 7 is increased relative to the total target flow rate of the plural hydraulic actuators **4*a*, 5*a*, and 6*a*. In addition, the difference between the respective inflow flow rates and the respective target flow rates of the plural hydraulic actuators 4*a*, 5*a*, and 6*a* is reflected only in control of the respective opening amounts of the plural directional control valves 8*a*1, 8*a*3, and 8*a*5. This can prevent interference between the delivery flow rate control of the hydraulic pump 7 and the opening control of the plural directional control valves 8*a*1, 8*a*3, and 8*a*5 with avoidance of the situation in which the delivery flow rate of the hydraulic pump 7 is insufficient. Due to this, the flow rate can be accurately distributed to the plural hydraulic actuators 4*a*, 5*a*, and 6*a*. Therefore, it becomes possible to cause the plural hydraulic actuators 4*a*, 5*a*, and 6*a*** to accurately operate according to operation by the operator.

Second Embodiment

A hydraulic excavator according to a second embodiment of the present invention will be described with focus on a difference from the first embodiment.

Figure 7:
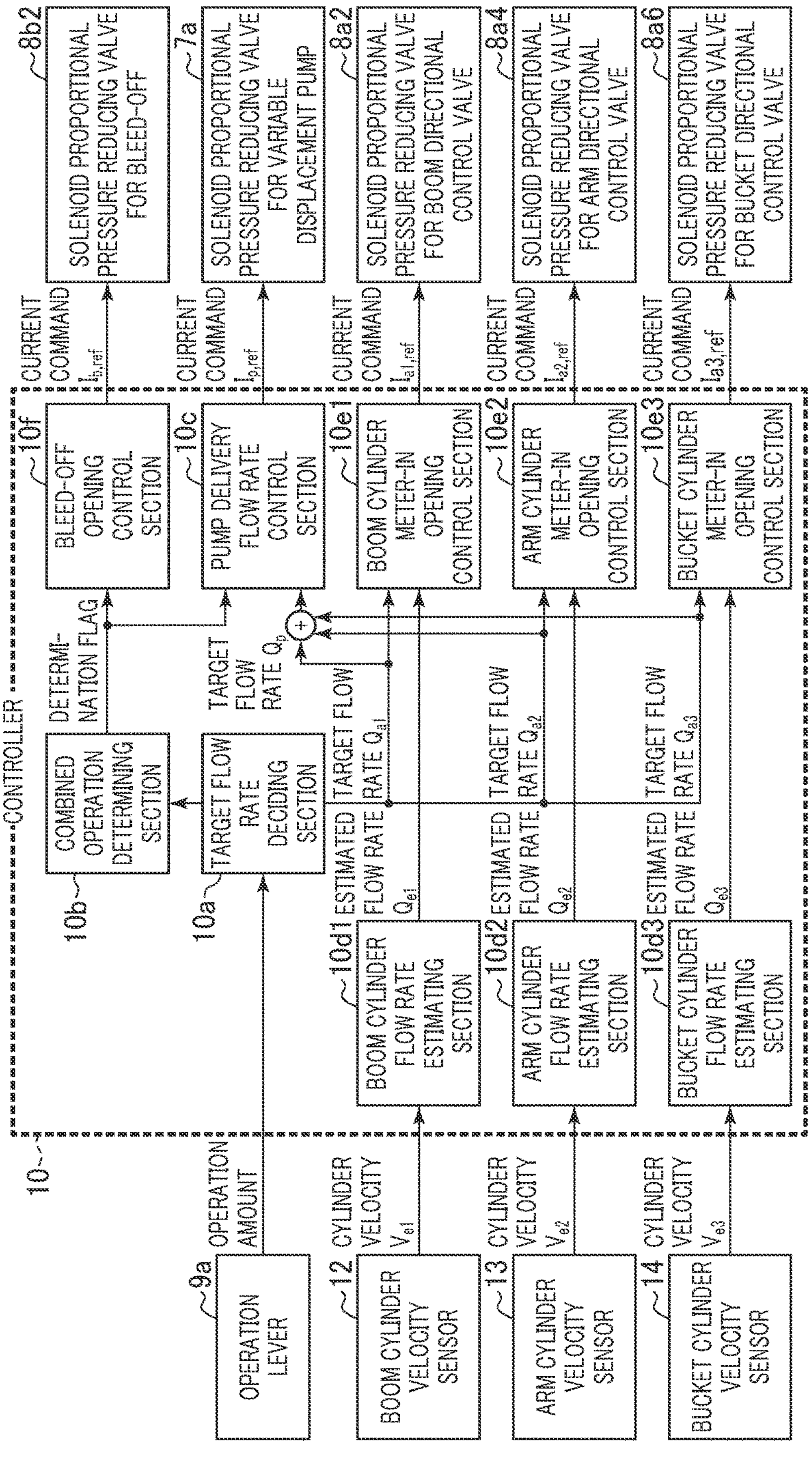
FIG. 7 is a functional block diagram that represents details of processing functions of the controller according to a second embodiment of the present invention.

FIG. 7 is a functional block diagram that represents details of processing functions of the controller 10 according to the second embodiment.

In the present embodiment, the bleed-off valve **8*b*1 is driven independently of the directional control valves 8*a*1, 8*a*3, and 8*a*5. The bleed-off opening control section 10*f* illustrated in FIG. 7 decides the opening amount of the bleed-off valve 8*b*1 on the basis of the combined operation determination flag inputted from the combined operation determining section 10*b*. When it is determined that the combined operation is being carried out, a command to open the bleed-off valve 8*b*1 is generated and the current command $I_{b,ref}$ is outputted to the solenoid proportional pressure reducing valve 8*b*2 for the bleed-off valve. When it is determined that the combined operation is not being carried out, a command to fully close the bleed-off valve 8*b*1 is generated and the current command $I_{b,ref}$ is outputted to the solenoid proportional pressure reducing valve 8*b*2** for the bleed-off valve.

Figure 8:
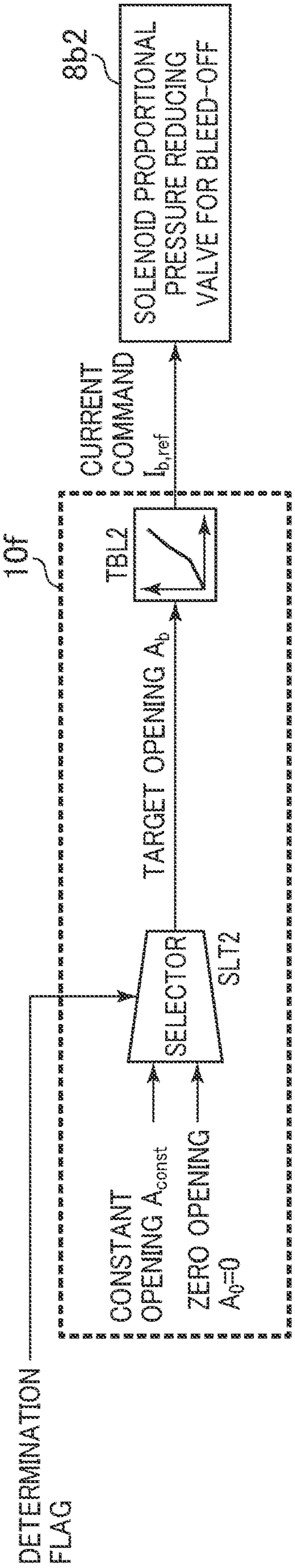
FIG. 8 is a control block diagram that represents details of a calculation function of the bleed-off opening control section according to the second embodiment of the present invention.

FIG. 8 is a control block diagram that represents details of a calculation function of the bleed-off opening control section **10*f*** according to the second embodiment.

In the bleed-off opening control section **10*f*, on the basis of the determination flag inputted from the combined operation determining section 10*b*, the constant opening $A_{const}$ is selected by a selector SLT2 when the combined operation is being carried out and zero opening $A_0=0$ is selected by the selector SLT2 when the combined operation is not being carried out. The selected opening amount is transmitted as the target opening $A_b$ of the bleed-off valve 8*b*1 and transformation is carried out from the target opening $A_b$ to the current command $I_{b,ref}$ by the transformation table TBL2**.

The current command $I_{b,ref}$ is outputted to the solenoid proportional pressure reducing valve **8*b*2** for the bleed-off valve.

Figure 9:
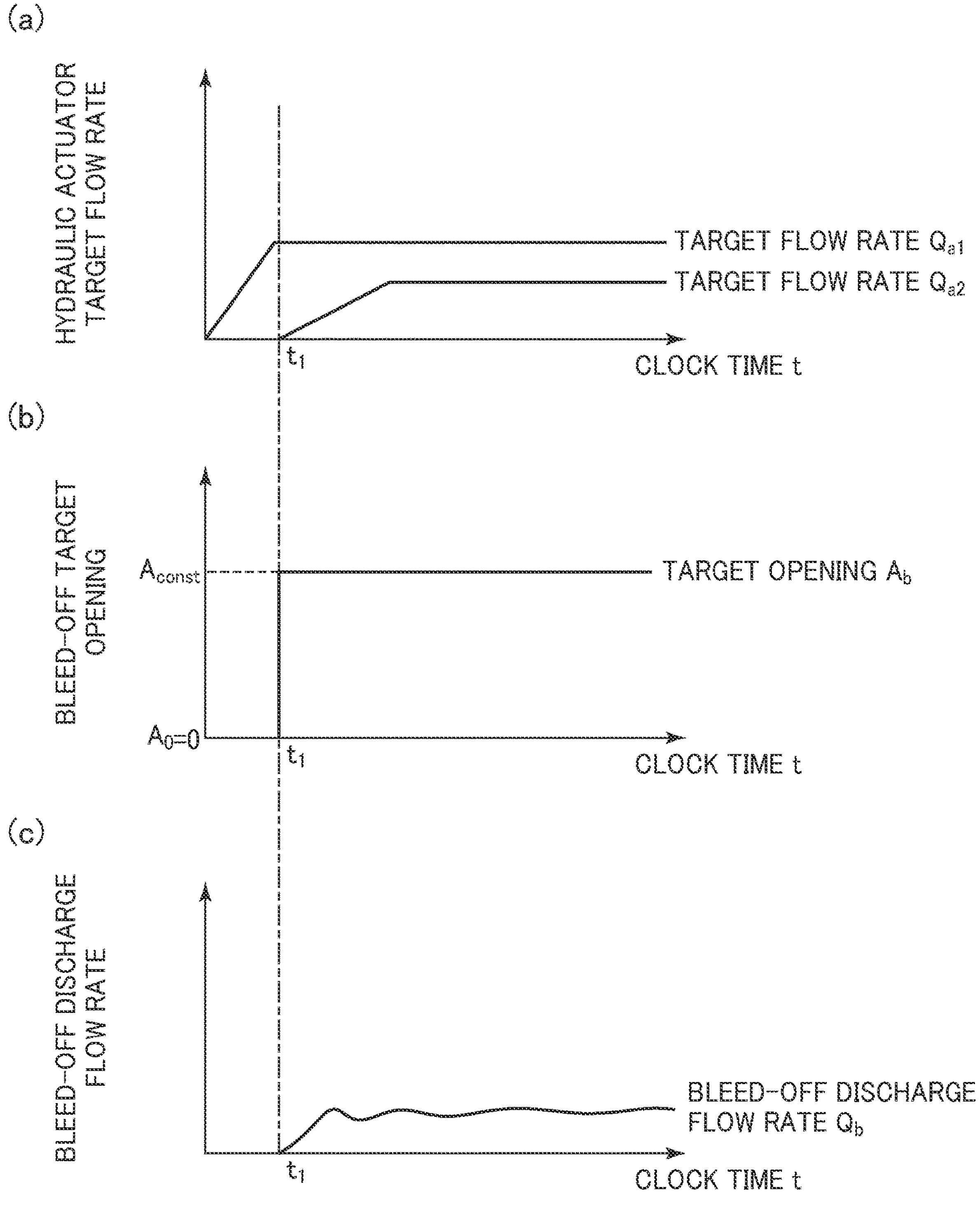
FIG. 9 is a diagram illustrating change in the flow rate of discharge from a bleed-off valve to a tank according to the second embodiment of the present invention.

FIG. 9 is a diagram illustrating change in the flow rate of discharge from the bleed-off valve **8*b*1 to the tank 41** according to the second embodiment.

FIG. 9(*a*) illustrates the target flow rate decided by the target flow rate deciding section **10*a* based on the operation amount inputted from the operation lever device 9*a*. Similarly to FIG. 5**(*a*), the case in which first the target flow rate $Q_{a1}$ is input to the boom cylinder meter-in opening control section **10*e*1 and the target flow rate $Q_{a2}$ is input to the arm cylinder meter-in opening control section 10*e*2** at the clock time $t_1$ is taken as one example.

FIG. 9(*b*) illustrates the target opening $A_b$ of the bleed-off valve **8*b*1 decided by the bleed-off opening control section 10*f* based on the determination flag inputted from the combined operation determining section 10*b*. Before the clock time $t_1$, the combined operation determining section 10*b* determines that the combined operation is not being carried out. Therefore, target opening $A_b$=0 holds and the setting is made in such a manner that the bleed-off valve 8*b*1 is fully closed. At and after the clock time $t_1$, the combined operation determining section 10*b*** determines that the combined operation is being carried out, and therefore target opening $A_b$=$A_{const}$ holds.

FIG. 9(*c*) illustrates a bleed-off discharge flow rate $Q_b$ at which discharge is carried out from the bleed-off valve **8*b*1 to the tank 41 when the current command $I_{b,ref}$ is input to the solenoid proportional pressure reducing valve 8*b*2 for the bleed-off valve from the bleed-off opening control section 10*f* and the bleed-off valve 8*b*1 is driven. Before the clock time $t_1$, the bleed-off valve 8*b*1 is in the fully-closed state and bleed-off discharge flow rate $Q_b$=0 holds. At and after the clock time $t_1$, the state in which the opening of the bleed-off valve 8*b*1 is opened by $A_{const}$ is made, and the bleed-off discharge flow rate $Q_b$ according to the delivery pressure of the hydraulic pump 7 is discharged to the tank 41**.

The construction machine 100 according to the present embodiment includes the bleed-off valve **8*b*1 for discharging the surplus part of the hydraulic fluid delivered by the hydraulic pump 7 in such a manner that the bleed-off valve 8*b*1 is driven independently of the plural directional control valves 8*a*1, 8*a*3, and 8*a*5. The controller 10 carries out control to open the bleed-off valve 8*b*1 when determining that the combined operation is being carried out and close the bleed-off valve 8*b*1** when determining that the combined operation is not being carried out.

According to the present embodiment configured as above, the following effect is obtained in addition to the same effects as the first embodiment.

By fully closing the bleed-off valve **8*b*1 when the combined operation is not being carried out, wasteful flow rate discharge from the bleed-off valve 8*b*1 to the tank 41 can be suppressed while the flow rate error at the time of the combined operation is corrected by the boom cylinder meter-in opening control section 10*e*1, the arm cylinder meter-in opening control section 10*e*2, and the bucket cylinder meter-in opening control section 10*e*3**. This makes it possible to achieve both the control accuracy of the hydraulic actuator and the energy saving performance.

Third Embodiment

A hydraulic excavator according to a third embodiment of the present invention will be described with focus on a difference from the first embodiment.

Figure 10:
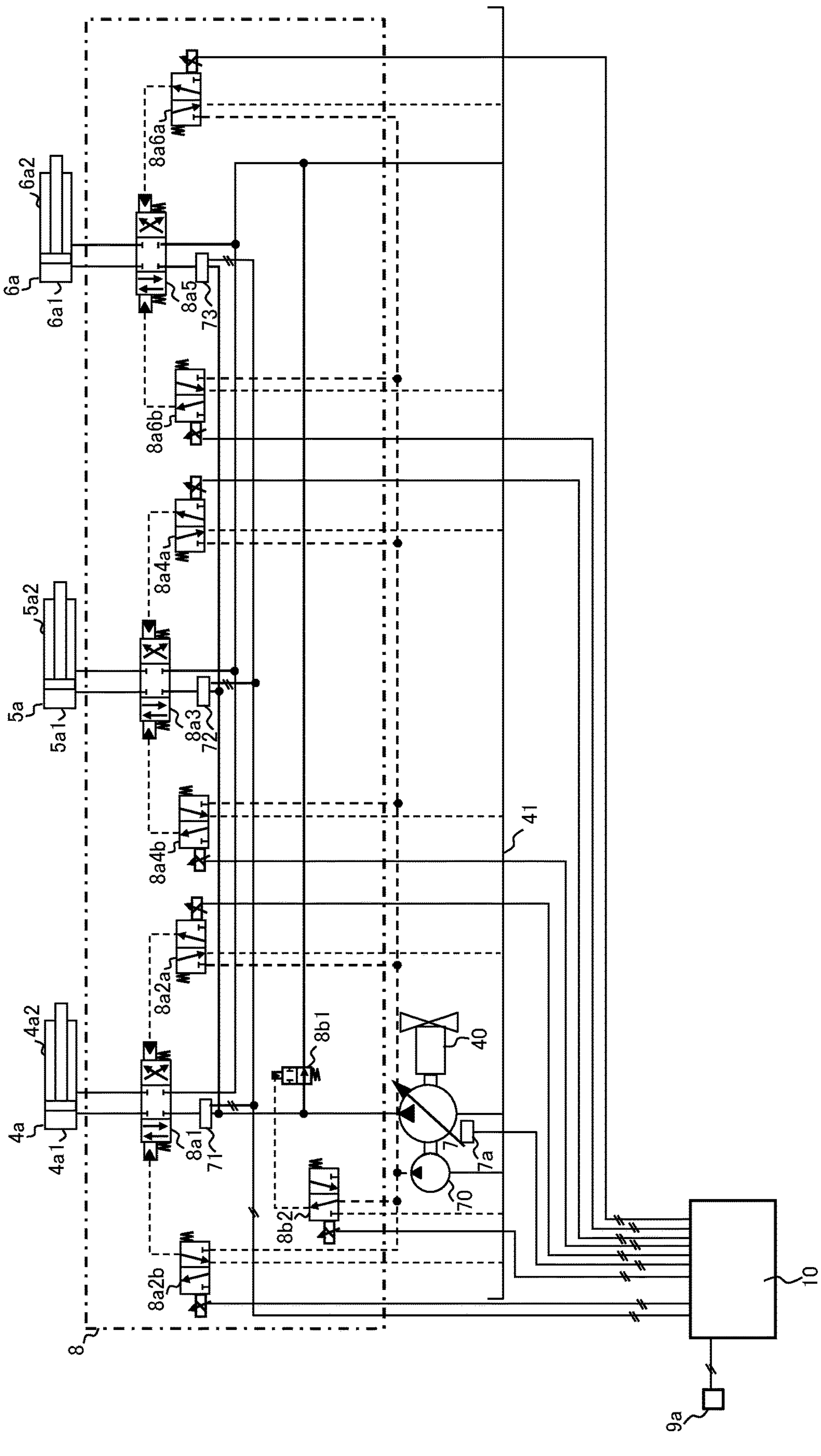
FIG. 10 is a diagram schematically illustrating a hydraulic actuator control system according to a third embodiment of the present invention.

FIG. 10 is a diagram schematically illustrating a hydraulic actuator control system according to the third embodiment.

In the hydraulic actuator control system illustrated in FIG. 10, a boom cylinder flow rate sensor 71 is installed upstream of the boom directional control valve **8*a*1, and an arm cylinder flow rate sensor 72 is installed upstream of the arm directional control valve 8*a*3, and a bucket cylinder flow rate sensor 73 is installed upstream of the bucket directional control valve 8*a*5. The flow rates of inflow to the boom cylinder 4*a*, the arm cylinder 5*a*, and the bucket cylinder 6*a* are directly estimated by the flow rate sensors 71 to 73. The flow rate sensors 71 to 73 are connected to the controller 10 through electrical wiring lines and output a flow rate sensing result to the controller 10**.

Figure 11:
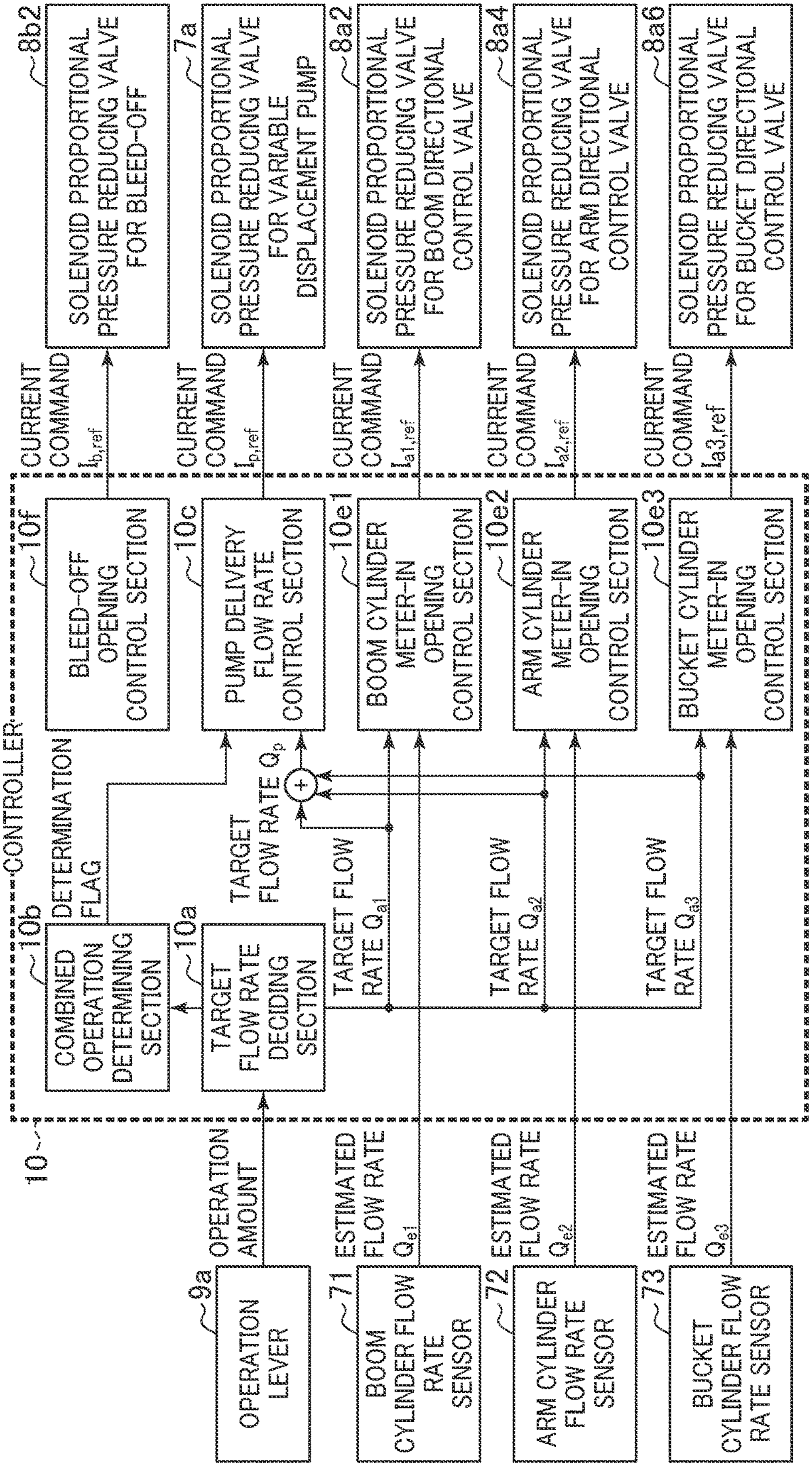
FIG. 11 is a functional block diagram that represents details of processing functions of the controller according to the third embodiment of the present invention.

FIG. 11 is a functional block diagram that represents details of processing functions of the controller 10 according to the third embodiment.

The boom cylinder flow rate sensor 71, the arm cylinder flow rate sensor 72, and the bucket cylinder flow rate sensor 73 output the computed estimated flow rates $Q_{e1}$, $Q_{e2}$, and $Q_{e3}$ to the boom cylinder meter-in opening control section **10*e*1, the arm cylinder meter-in opening control section 10*e*2, and the bucket cylinder meter-in opening control section 10*e*3**.

The construction machine 100 according to the present embodiment includes the plural flow rate sensors 71 to 73 each disposed upstream of the plural directional control valves **8*a*1, 8*a*3, and 8*a*5 instead of the velocity sensors 12 to 14**.

According to the present embodiment configured as above, the following effect is obtained in addition to the same effects as the first embodiment.

By directly sensing the inflow flow rates to the respective hydraulic actuators **4*a* to 6*a* by the boom cylinder flow rate sensor 71, the arm cylinder flow rate sensor 72, and the bucket cylinder flow rate sensor 73, the estimation error of the estimated flow rates $Q_{e1}$, $Q_{e2}$, and $Q_{e3}$ due to the influence of friction and vibration at the time of hydraulic actuator operation can be removed and the estimated flow rates $Q_{e1}$, $Q_{e2}$, and $Q_{e3}$ can be computed more accurately. In addition, by controlling each opening amount of the directional control valves 8*a*1, 8*a*3, and 8*a*5 by using the more accurate estimated flow rates $Q_{e1}$, $Q_{e2}$, and $Q_{e3}$, the inflow flow rates to the hydraulic actuators 4*a*, 5*a*, and 6*a*** can be distributed more accurately.

Fourth Embodiment

A hydraulic excavator according to a fourth embodiment of the present invention will be described with focus on a difference from the first embodiment.

Figure 12:
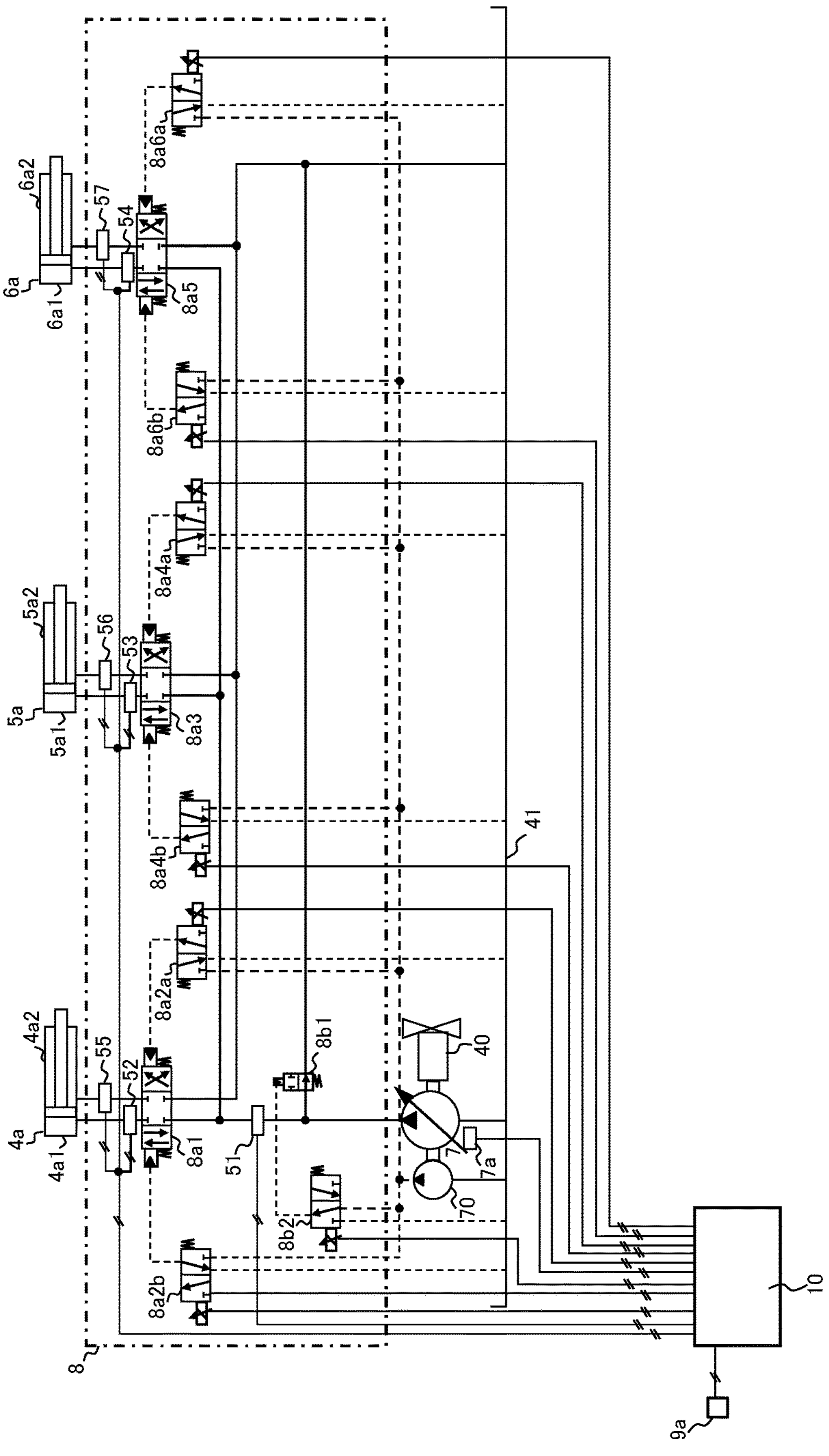
FIG. 12 is a diagram schematically illustrating a hydraulic actuator control system according to a fourth embodiment of the present invention.

FIG. 12 is a diagram schematically illustrating a hydraulic actuator control system according to the fourth embodiment.

In the hydraulic actuator control system illustrated in FIG. 12, a pump delivery pressure sensor 51 for measuring the delivery pressure of the hydraulic pump 7, boom load pressure sensors 52 and 55 for measuring the boom load pressure on the downstream side of the boom meter-in valve **8*a*1, arm load pressure sensors 53 and 56 for measuring the arm load pressure on the downstream side of the arm meter-in valve 8*a*3, and bucket load pressure sensors 54 and 57 for measuring the bucket load pressure on the downstream side of the bucket meter-in valve 8*a*5 are installed. The pressure sensors 51 to 57 are connected to the controller 10 through electrical wiring lines and output a pressure sensing result to the controller 10**.

Figure 13:
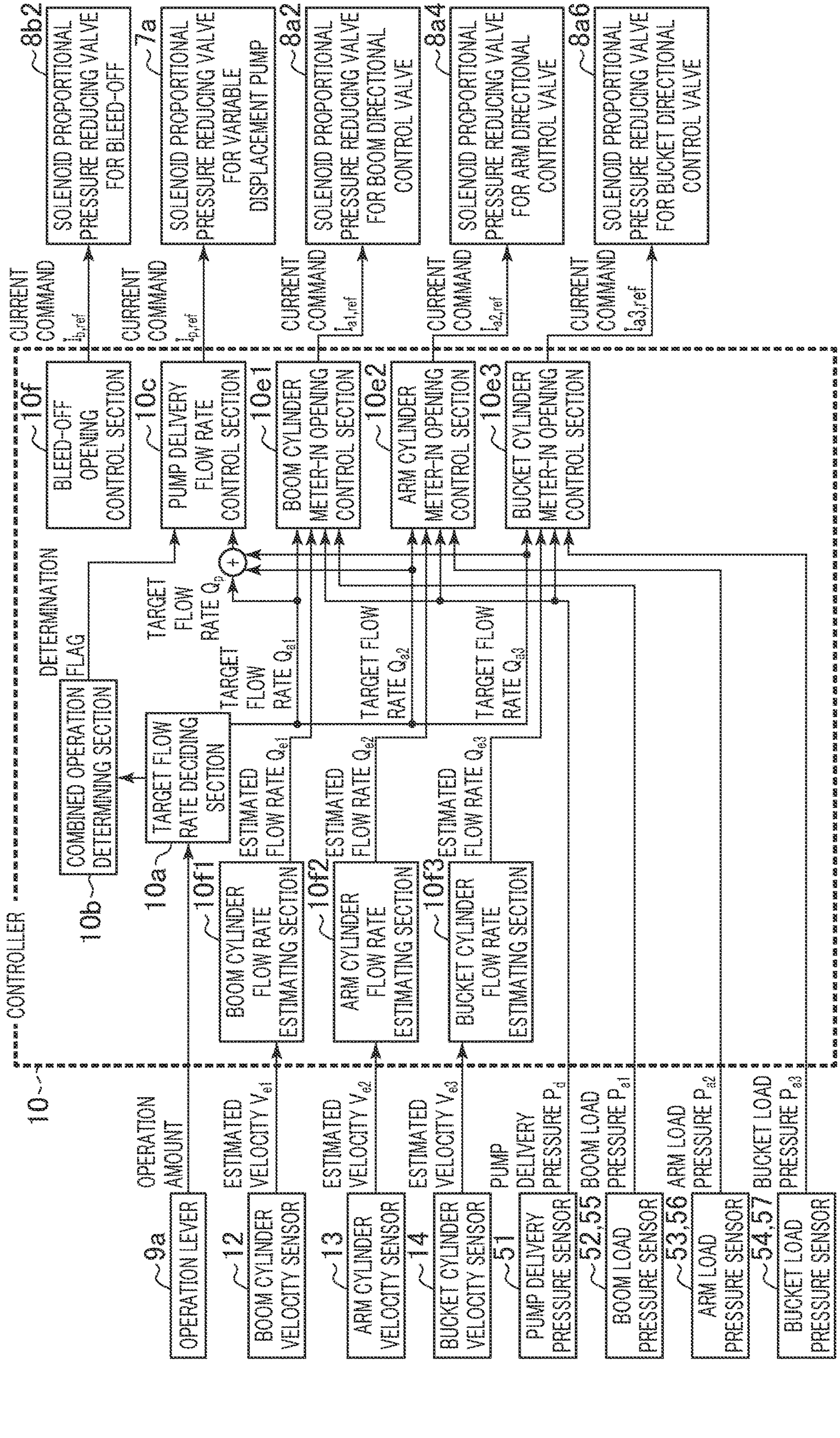
FIG. 13 is a functional block diagram that represents details of processing functions of the controller according to the fourth embodiment of the present invention.

FIG. 13 is a functional block diagram that represents details of processing functions of the controller 10 according to the fourth embodiment.

To the boom cylinder meter-in opening control section **10*e*1, a pump delivery pressure $P_d$ sensed by the pump delivery pressure sensor 51 and a boom load pressure $P_{a1}$ sensed by the boom load pressure sensors 52 and 55 are input in addition to the target flow rate $Q_{a1}$ computed by the target flow rate deciding section 10*a* and the estimated flow rate $Q_{e1}$ estimated by a boom cylinder flow rate estimating section 10*f*1. The boom cylinder meter-in opening control section 10*e*1** transforms, by the following expression (5), the post-correction target flow rate $Q_{a1,new}$ computed by expression (2) to the target opening amount $A_{a1}$.

[Expression 5]

$$A_{a1} = k\frac{Q_{a1,new}}{\sqrt{P_d - P_{a1}}} \tag{5}$$

Here, k is a positive constant value defined with the influence of the flow rate coefficient, the density of the hydraulic fluid, and so forth being also taken into consideration. As shown in the denominator of the right side of expression (5), the target opening amount $A_{a1}$ of the boom meter-in valve **8*a*1 is decided in consideration of the differential pressure between the pressure on the upstream side of the boom meter-in valve 8*a*1 (pump delivery pressure $P_d$) and the pressure on the downstream side (boom load pressure $P_{a1}$). This can compensate change in the passing flow rate of the boom meter-in valve 8*a*1 due to the influence of the differential pressure. The current command $I_{a1,ref}$ to the solenoid proportional pressure reducing valves 8*a*2** for the boom directional control valve is computed by using expressions (2), (4), and (5).

The arm cylinder meter-in opening control section **10*e*2 uses the target flow rate $Q_{a2}$, the estimated flow rate $Q_{e2}$, the pump delivery pressure $P_d$, and the arm load pressure $P_{a2}$ to compute the current command $I_{a2}$, ref from expressions (2), (4), and (5). The bucket cylinder meter-in opening control section 10*e*3** uses the target flow rate $Q_{a3}$, the estimated flow rate $Q_{e3}$, the pump delivery pressure $P_d$, and the bucket load pressure $P_{a3}$ to compute the current command $I_{a3,ref}$ from expressions (2), (4), and (5).

The construction machine 100 according to the present embodiment further includes the first pressure sensor 51 disposed on the respective hydraulic fluid lines that couple the hydraulic pump 7 to the plural directional control valves **8*a*1, 8*a*3, and 8*a*5 and the second pressure sensors 52 to 57 disposed on the respective hydraulic fluid lines that couple the plural directional control valves 8*a*1, 8*a*3, and 8*a*5 to the plural hydraulic actuators 4*a*, 5*a*, and 6*a*. The controller 10 controls the plural directional control valves 8*a*1, 8*a*3, and 8*a*5 according to the differential pressures across the plural directional control valves 8*a*1, 8*a*3, and 8*a*5 sensed by the first pressure sensor 51 and the second pressure sensors 52 to 57**.

According to the present embodiment configured as above, the following effect is obtained in addition to the same effects as the first embodiment.

By deciding the target opening amount $A_{a1}$ of the meter-in valves **8*a*1, 8*a*3, and 8*a*5 in consideration of the differential pressure between the pressure on the upstream side of the meter-in valves 8*a*1, 8*a*3, and 8*a*5 (pump delivery pressure $P_d$) and the pressure on the downstream side (load pressure $P_{a1}$), change in the passing flow rate of the meter-in valve due to the influence of the differential pressure can be compensated. This can improve the velocity responsiveness of the hydraulic actuators 4*a* to 6*a*** with respect to variation in the load pressure.

Fifth Embodiment

A hydraulic excavator according to a fifth embodiment of the present invention will be described with focus on a difference from the fourth embodiment.

Figure 14:
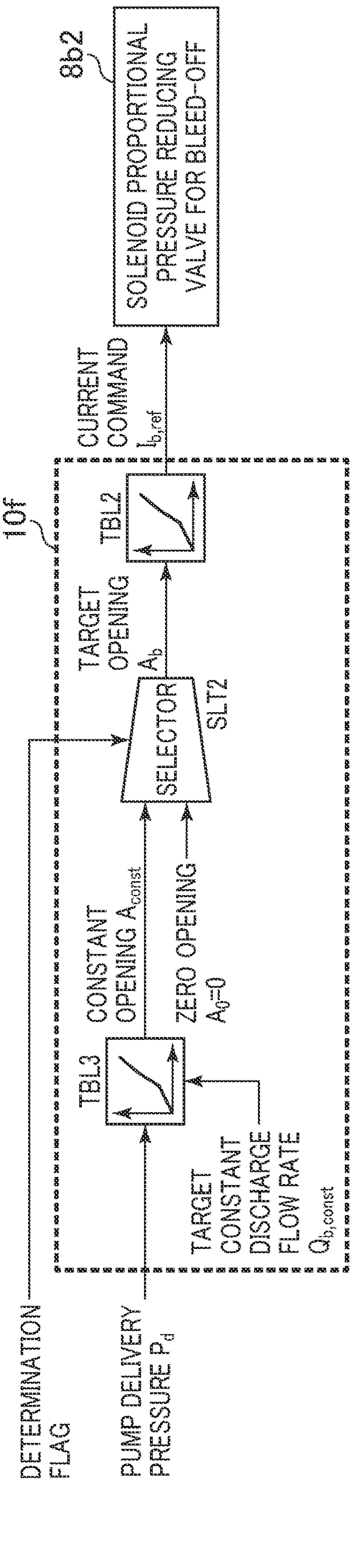
FIG. 14 is a control block diagram that represents details of a calculation function of the bleed-off opening control section according to a fifth embodiment of the present invention.

FIG. 14 is a control block diagram that represents details of a calculation function of the bleed-off opening control section **10*f*** according to the fifth embodiment.

The bleed-off opening control section **10*f* computes the current command $I_{b,ref}$ to the solenoid proportional pressure reducing valve 8*b*2 for the bleed-off valve on the basis of the pump delivery pressure $P_d$ inputted from the pump delivery pressure sensor 51 in addition to the determination flag inputted from the combined operation determining section 10*b***.

When a load is applied to the hydraulic actuator, the pump delivery pressure $P_d$ increases and the discharge flow rate of discharge from the bleed-off valve **8*b*1 to the tank 41** increases. It is anticipated that, when the discharge flow rate increases, the flow rate of inflow to the hydraulic actuator decreases and the error between the target flow rate and the estimated flow rate increases.

In order to prevent the increase in the flow rate error when a load is applied to the hydraulic actuator, for example, the constant opening $A_{const}$ shown in FIG. 14 is computed from the following expression (6) according to the pump delivery pressure $P_d$.

[Expression 6]

$$A_{const} = k\frac{Q_{b,const}}{\sqrt{P_d}} \tag{6}$$

Here, $Q_{b,const}$ is a target constant discharge flow rate of discharge from the bleed-off valve **8*b*1. The pump delivery pressure $P_d$ sensed by the pump delivery pressure sensor 51 is used as input and the constant opening $A_{const}$ is computed by TBL3** to carry out calculation of expression (6).

By TBL3, the opening amount of the bleed-off valve **8*b*1** is adjusted to carry out discharge at the constant flow rate $Q_{b,const}$ irrespective of variation in the pump delivery pressure $P_d$.

The construction machine according to the present embodiment further includes the pressure sensor 51 disposed downstream of the hydraulic pump 7 and the controller 10 corrects the opening amount of the bleed-off valve **8*b*1 according to the pressure on the downstream side of the hydraulic pump 7 sensed by the pressure sensor 51**.

According to the present embodiment configured as above, the following effect is obtained in addition to the same effects as the fourth embodiment.

By carrying out control in such a direction that the opening of the bleed-off valve **8*b*1 is closed in response to increase in the load on the hydraulic actuators 4*a*, 5*a*, and 6*a* and reducing the discharge flow rate to the tank 41, decrease in the flow rate of inflow to the hydraulic actuators 4*a*, 5*a*, and 6*a*** can be prevented.

Sixth Embodiment

A hydraulic excavator according to a sixth embodiment of the present invention will be described with focus on a difference from the first embodiment.

Figure 15:
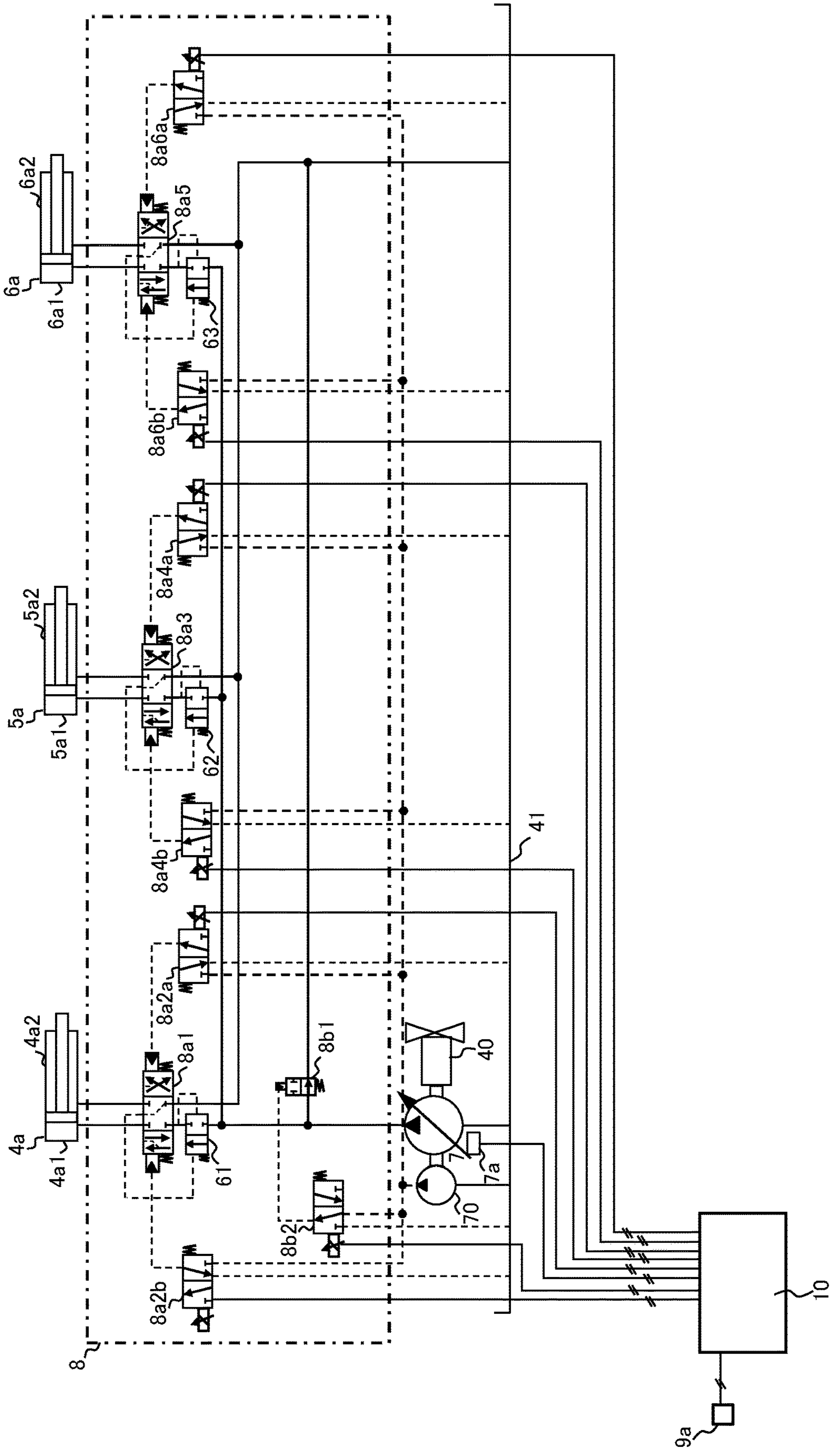
FIG. 15 is a diagram schematically illustrating a hydraulic actuator control system according to a sixth embodiment of the present invention.

FIG. 15 is a diagram schematically illustrating a hydraulic actuator control system according to the sixth embodiment.

In the hydraulic actuator control system illustrated in FIG. 15, a boom pressure compensating valve 61 is installed upstream of the boom directional control valve 8*a*1, an arm pressure compensating valve 62 is installed upstream of the arm directional control valve 8*a*3, and a bucket pressure compensating valve 63 is installed upstream of the bucket directional control valve 8*a*5. The pressure compensating valves 61 to 63 have pressure receiving parts to which the pressures in hydraulic fluid lines between the pressure compensating valves 61 to 63 and the directional control valves 8*a*1, 8*a*3, and 8*a*5 and the pressures in hydraulic fluid lines between the directional control valves 8*a*1, 8*a*3, and 8*a*5 and the hydraulic actuators 4*a*, 5*a*, and 6*a* are introduced, and adjust the openings in such a manner that the pressures on the upstream side and the downstream side of the directional control valves 8*a*1, 8*a*3, and 8*a*5 are kept constant.

The construction machine 100 according to the present embodiment includes each of the pressure compensating valves 61 to 63 for keeping the pressure difference between the upstream side and the downstream side of the plural directional control valves 8*a*1, 8*a*3, and 8*a*5 constant on the respective upstream sides of the plural directional control valves 8*a*1, 8*a*3, and 8*a*5.

According to the present embodiment configured as above, the following effect is obtained in addition to the same effects as the first embodiment.

The pressure compensating valves 61 to 63 cause the differential pressures across the meter-in valves 8*a*1, 8*a*3, and 8*a*5 to be adjusted to be constant. Due to this, without installing the pressure sensors 51 to 57 illustrated in FIG. 12, change in the passing flow rate of the meter-in valves due to the influence of the differential pressures across the meter-in valves 8*a*1, 8*a*3, and 8*a*5 can be compensated. This can suppress the installation cost of the pressure sensor and simplify the electronic control logic of the controller 10.

Although the embodiments of the present invention have been described in detail above, the present invention is not limited to the above-described embodiments and various modification examples are included therein. For example, the above-described embodiments are what are described in detail for explaining the present invention in an easy-to-understand manner and are not necessarily limited to what include all configurations described. Furthermore, it is also possible to add part of a configuration of a certain embodiment to a configuration of another embodiment, and it is also possible to delete part of a configuration of a certain embodiment or replace the part by part of another embodiment.

DESCRIPTION OF REFERENCE CHARACTERS

1: Front device
2: Upper swing structure
2*a*: Swing motor (hydraulic actuator)
3: Lower track structure
3*a*: Traveling motor
4: Boom
4*a*: Boom cylinder
5: Arm
5*a*: Arm cylinder
5*a*1: Bottom-side fluid chamber
5*a*2: Rod-side fluid chamber
6: Bucket
6*a*: Bucket cylinder (hydraulic actuator)
6*a*1: Bottom-side fluid chamber
6*a*2: Rod-side fluid chamber
7: Hydraulic pump
7*a*: Solenoid proportional pressure reducing valve for the variable displacement pump (regulator)
8: Control valve
8*a*1: Boom directional control valve (boom meter-in valve)
8*a*2: Solenoid proportional pressure reducing valve for the boom directional control valve
8*a*3: Arm directional control valve (arm meter-in valve)
8*a*4: Solenoid proportional pressure reducing valve for the arm directional control valve
8*a*5: Bucket directional control valve (bucket meter-in valve)
8*a*6: Solenoid proportional pressure reducing valve for the bucket directional control valve
8*b*1: Bleed-off valve
8*b*2: Solenoid proportional pressure reducing valve for the bleed-off valve
9: Cab
10: Controller
10*a*: Target flow rate deciding section
10*b*: Combined operation determining section
10*c*: Pump delivery flow rate control section
10*d*1: Boom cylinder flow rate estimating section
10*d*2: Arm cylinder flow rate estimating section
10*d*3: Bucket cylinder flow rate estimating section
10*e*1: Boom cylinder meter-in opening control section
10*e*2: Arm cylinder meter-in opening control section
10*e*3: Bucket cylinder meter-in opening control section
10*f*: Bleed-off opening control section
12: Boom inertial measurement unit (boom cylinder velocity sensor)
13: Arm inertial measurement unit (arm cylinder velocity sensor)
14: Bucket inertial measurement unit (bucket cylinder velocity sensor)
40: Prime mover
41: Tank
51: Pump delivery pressure sensor (first pressure sensor)
52: Boom load pressure sensor (second pressure sensor)
53: Arm load pressure sensor (second pressure sensor)
54: Bucket load pressure sensor (second pressure sensor)
55: Boom load pressure sensor (second pressure sensor)
56: Arm load pressure sensor (second pressure sensor)
57: Bucket load pressure sensor (second pressure sensor)
61: Boom pressure compensating valve
62: Arm pressure compensating valve
63: Bucket pressure compensating valve
71: Boom cylinder flow rate sensor
72: Arm cylinder flow rate sensor
73: Bucket cylinder flow rate sensor
100: Hydraulic excavator (construction machine)

The invention claimed is:

1. A construction machine comprising:

a hydraulic pump;

a regulator that adjusts a delivery flow rate of the hydraulic pump;

a plurality of hydraulic actuators;

a plurality of directional control valves that adjust a flow rate of a hydraulic fluid that is delivered from the hydraulic pump and is distributed to the plurality of hydraulic actuators;

an operation device for operating the plurality of hydraulic actuators; and a controller configured to decide a target flow rate that is a target value of an inflow flow rate of each of the plurality of hydraulic actuators on a basis of an operation signal inputted from the operation device and control the regulator and the plurality of directional control valves according to the respective target flow rates of the plurality of hydraulic actuators, wherein the construction machine includes velocity sensors that sense respective operation velocities of the plurality of hydraulic actuators, and the controller is configured to calculate the respective inflow flow rates of the plurality of hydraulic actuators on a basis of the respective operation velocities of the plurality of hydraulic actuators sensed by the velocity sensors, determine whether or not combined operation in which two or more hydraulic actuators in the plurality of hydraulic actuators are simultaneously operated is being carried out, on a basis of the operation signal inputted from the operation device, and in a case of determining that the combined operation is being carried out, control the regulator in such a manner that the delivery flow rate of the hydraulic pump becomes larger than a total target flow rate of the plurality of hydraulic actuators and control respective opening amounts of the plurality of directional control valves in such a manner that a difference between the respective target flow rates of the plurality of hydraulic actuators and the respective inflow flow rates of the plurality of hydraulic actuators sensed by the velocity sensors becomes small.

2. The construction machine according to claim 1, wherein the construction machine includes a bleed-off valve for discharging a surplus part of the hydraulic fluid delivered by the hydraulic pump, in such a manner that the bleed-off valve is driven independently of the plurality of directional control valves, and the controller is configured to carry out control to open the bleed-off valve in the case of determining that the combined operation is being carried out and close the bleed-off valve in a case of determining that the combined operation is not being carried out.

3. The construction machine according to claim 2, wherein the construction machine further includes a pressure sensor disposed downstream of the hydraulic pump, and the controller is configured to correct an opening amount of the bleed-off valve according to a pressure of a downstream side of the hydraulic pump sensed by the pressure sensor.

4. The construction machine according to claim 1, wherein the construction machine includes a first pressure sensor disposed on respective hydraulic fluid lines that couple the hydraulic pump to the plurality of directional control valves, and second pressure sensors disposed on respective hydraulic fluid lines that couple the plurality of directional control valves to the plurality of hydraulic actuators, and the controller is configured to control the plurality of directional control valves according to differential pressures across the plurality of directional control valves sensed by the first pressure sensor and the second pressure sensors.

5. The construction machine according to claim 1, wherein the construction machine includes a pressure compensating valve for keeping pressure difference between an upstream side and a downstream side of each of the plurality of directional control valves constant, the pressure compensating valve being provided on each of the upstream sides of the plurality of directional control valves.

6. A construction machine comprising:

a hydraulic pump;

a regulator that adjusts a delivery flow rate of the hydraulic pump;

a plurality of hydraulic actuators;

a plurality of directional control valves that adjust a flow rate of hydraulic fluid that is delivered from the hydraulic pump and is distributed to the plurality of hydraulic actuators;

an operation device for operating the plurality of hydraulic actuators; and a controller configured to decide a target flow rate that is a target value of an inflow flow rate of each of the plurality of hydraulic actuators on a basis of an operation signal inputted from the operation device and control the regular and the plurality of directional control valves according to the respective target flow rates of the plurality of hydraulic actuators, wherein the construction machine includes a plurality of flow rate sensors each disposed upstream of the plurality of directional control valves that sense respective operation velocities of the plurality of hydraulic actuators, and the controller is configured to calculate the respective inflow flow rates of the plurality of hydraulic actuators on a basis of the respective operation velocities of the plurality of hydraulic actuators sensed by the flow rate sensors, determine whether or not combined operation in which two or more hydraulic actuators in the plurality of hydraulic actuators are simultaneously operated being carried out, on a basis of the operation signal inputted from the operation device, in a case of determining that the combined operation is being carried out, control the regulator on such a manner that the delivery flow rate of the hydraulic pump becomes larger than a total target flow rate of the plurality of hydraulic actuators and control respective opening amounts of the plurality of directional control valves in such a manner that a difference between the respective target flow rates of the plurality of hydraulic actuators and the respective inflow flow rates of plurality of hydraulic actuators sensed by the flow rate sensors becomes small.

* * * * *